(12) United States Patent
Wookey et al.

(10) Patent No.: US 7,240,109 B2
(45) Date of Patent: Jul. 3, 2007

(54) REMOTE SERVICES SYSTEM SERVICE MODULE INTERFACE

(75) Inventors: Michael J. Wookey, Santa Clara, CA (US); Trevor Watson, Sheffield (GB); Jean Chouanard, Redwood City, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 924 days.

(21) Appl. No.: 10/186,106

(22) Filed: Jun. 27, 2002

(65) Prior Publication Data

US 2004/0003083 A1 Jan. 1, 2004

(51) Int. Cl.
*G06F 15/173* (2006.01)

(52) U.S. Cl. ............ 709/223; 709/203; 709/219; 717/101; 717/120

(58) Field of Classification Search ............ 709/203, 709/219, 223; 717/101, 120
See application file for complete search history.

(56) References Cited

U.S. PATENT DOCUMENTS

| | | | |
|---|---|---|---|
| 5,245,616 A | 9/1993 | Olson | 714/748 |
| 5,432,798 A | 7/1995 | Blair | 714/748 |
| 5,528,677 A | 6/1996 | Butler et al. | 379/196 |
| 5,541,927 A | 7/1996 | Kristol et al. | 370/94.2 |
| 5,677,918 A | 10/1997 | Tran et al. | 371/32 |
| 5,729,537 A | 3/1998 | Billström | 370/329 |
| 5,805,804 A | 9/1998 | Laursen et al. | 395/200.02 |
| 5,884,316 A | 3/1999 | Bernstein et al. | 719/315 |
| 5,892,754 A | 4/1999 | Kompella et al. | 370/236 |
| 5,905,871 A | 5/1999 | Buskens et al. | 395/200.75 |
| 5,933,140 A | 8/1999 | Strahorn et al. | 345/338 |
| 5,974,417 A | 10/1999 | Bracho et al. | 707/10 |
| 5,987,514 A | 11/1999 | Rangarajan | 709/224 |
| 6,014,437 A | 1/2000 | Acker et al. | 379/219 |
| 6,023,507 A | 2/2000 | Wookey | 380/21 |
| 6,023,698 A | 2/2000 | Lavey, Jr. et al. | 707/10 |
| 6,055,364 A | 4/2000 | Speakman et al. | 395/200.59 |
| 6,085,244 A | 7/2000 | Wookey | 709/224 |
| 6,094,688 A | 7/2000 | Mellen-Garnett et al. | 709/328 |
| 6,097,720 A | 8/2000 | Araujo et al. | 370/355 |
| 6,098,093 A | 8/2000 | Bayeh et al. | 709/203 |
| 6,131,112 A | 10/2000 | Lewis et al. | 709/207 |
| 6,141,759 A | 10/2000 | Braddy | 713/201 |

(Continued)

OTHER PUBLICATIONS

G. Cugola, E. Di Nitto and A Fuggetta, "Exploiting an Event-Based Infrastructure to Develop Complex Distributed Systems" *Software Engineering, 1998. Proceedings of the 1998 International Conference on Kyoto, Japan* Apr. 19-25, 1998.

(Continued)

*Primary Examiner*—David Wiley
*Assistant Examiner*—Phuoc H Nguyen
(74) *Attorney, Agent, or Firm*—Michael C. Martensen; William J. Kubida; Hogan & Hartson LLP

(57) ABSTRACT

The invention relates to an apparatus for interfacing between a plurality of service modules and a remote services system which includes a service module application program interface. The service module application program interface provides an interface between the plurality of service modules and a remote services infrastructure. The service module application program interface is distributed within the remote services infrastructure.

10 Claims, 15 Drawing Sheets

U.S. PATENT DOCUMENTS

| | | | | |
|---|---|---|---|---|
| 6,145,096 | A | 11/2000 | Bereiter et al. | 714/25 |
| 6,148,337 | A | 11/2000 | Estberg et al. | 709/224 |
| 6,151,683 | A | 11/2000 | Wookey | 714/2 |
| 6,154,128 | A | 11/2000 | Wookey et al. | 340/506 |
| 6,167,431 | A | 12/2000 | Gillies et al. | 709/203 |
| 6,182,249 | B1 | 1/2001 | Wookey et al. | 714/47 |
| 6,185,606 | B1 | 2/2001 | Bereiter | 709/206 |
| 6,216,173 | B1* | 4/2001 | Jones et al. | 709/231 |
| 6,219,700 | B1 | 4/2001 | Chang et al. | 709/222 |
| 6,237,040 | B1 | 5/2001 | Tada | 709/246 |
| 6,237,114 | B1 | 5/2001 | Wookey et al. | 714/47 |
| 6,243,451 | B1 | 6/2001 | Shah et al. | 379/201 |
| 6,275,953 | B1 | 8/2001 | Vahalia et al. | 714/11 |
| 6,332,163 | B1 | 12/2001 | Bowman-Amuah | 709/231 |
| 6,335,927 | B1 | 1/2002 | Elliott et al. | 370/352 |
| 6,338,088 | B1 | 1/2002 | Waters et al. | 709/226 |
| 6,347,374 | B1 | 2/2002 | Drake et al. | 713/200 |
| 6,349,340 | B1 | 2/2002 | Dyer et al. | 709/231 |
| 6,353,854 | B1 | 3/2002 | Cromer et al. | 709/224 |
| 6,357,017 | B1 | 3/2002 | Bereiter et al. | 714/27 |
| 6,442,571 | B1 | 8/2002 | Haff et al. | 707/201 |
| 6,466,976 | B1 | 10/2002 | Alles et al. | 709/224 |
| 6,466,981 | B1 | 10/2002 | Levy | 709/227 |
| 6,473,794 | B1* | 10/2002 | Guheen et al. | 709/223 |
| 6,523,035 | B1 | 2/2003 | Fleming et al. | 707/10 |
| 6,552,999 | B2 | 4/2003 | Iwase et al. | 370/230 |
| 6,553,129 | B1 | 4/2003 | Rhoads | 382/100 |
| 6,615,258 | B1 | 9/2003 | Barry et al. | 709/223 |
| 6,621,801 | B1 | 9/2003 | Wright et al. | 370/319 |
| 6,633,898 | B1 | 10/2003 | Seguchi et al. | 709/201 |
| 6,640,244 | B1* | 10/2003 | Bowman-Amuah | 709/207 |
| 6,665,754 | B2 | 12/2003 | Mann | 710/52 |
| 6,687,735 | B1 | 2/2004 | Logston et al. | 709/203 |
| 6,691,165 | B1 | 2/2004 | Bruck et al. | 709/227 |
| 6,691,302 | B1 | 2/2004 | Skrzynski et al. | 717/118 |
| 6,711,611 | B2 | 3/2004 | Hanhan | 709/218 |
| 6,760,861 | B2 | 7/2004 | Fukuhara et al. | 709/203 |
| 6,765,864 | B1 | 7/2004 | Natarajan et al. | 370/224 |
| 6,779,030 | B1* | 8/2004 | Dugan et al. | 709/223 |
| 6,781,999 | B2 | 8/2004 | Eyuboglu et al. | 370/399 |
| 6,785,728 | B1 | 8/2004 | Schneider et al. | 709/229 |
| 6,792,461 | B1 | 9/2004 | Hericourt | 709/225 |
| 6,816,882 | B1 | 11/2004 | Conner et al. | 709/203 |
| 6,822,961 | B1 | 11/2004 | Constantinof et al. | 370/395.2 |
| 6,850,893 | B2 | 2/2005 | Lipkin et al. | 705/8 |
| 6,856,676 | B1 | 2/2005 | Pirot et al. | 379/201.01 |
| 6,868,441 | B2* | 3/2005 | Greene et al. | 709/220 |
| 6,895,586 | B1 | 5/2005 | Brasher et al. | 719/313 |
| 6,957,260 | B1* | 10/2005 | Mighdoll et al. | 709/225 |
| 2001/0004595 | A1 | 6/2001 | Dent | 455/435 |
| 2001/0034782 | A1 | 10/2001 | Kinkade | 709/219 |
| 2001/0047386 | A1 | 11/2001 | Domenikos et al. | 709/203 |
| 2002/0038340 | A1 | 3/2002 | Whipple et al. | 709/203 |
| 2002/0042849 | A1 | 4/2002 | Ho et al. | 709/329 |
| 2002/0046294 | A1 | 4/2002 | Brodsky et al. | 709/246 |
| 2002/0059425 | A1 | 5/2002 | Belfiore et al. | 709/226 |
| 2002/0065929 | A1 | 5/2002 | Kamentsky et al. | 709/231 |
| 2002/0073236 | A1 | 6/2002 | Helgeson et al. | 709/246 |
| 2002/0087657 | A1 | 7/2002 | Hunt | 709/217 |
| 2002/0114305 | A1 | 8/2002 | Oyama et al. | 370/338 |
| 2002/0136201 | A1 | 9/2002 | Buchsbaum et al. | 370/352 |
| 2002/0156871 | A1 | 10/2002 | Munarriz et al. | 709/219 |
| 2002/0156975 | A1 | 10/2002 | Staub et al. | 711/114 |
| 2002/0174340 | A1 | 11/2002 | Dick et al. | 713/178 |
| 2002/0178262 | A1 | 11/2002 | Bonnell et al. | 709/225 |
| 2002/0199182 | A1 | 12/2002 | Whitehead | 725/1 |
| 2003/0145117 | A1 | 7/2003 | Bhat | 709/249 |
| 2003/0237016 | A1 | 12/2003 | Johnson et al. | 714/4 |
| 2004/0002978 | A1 | 1/2004 | Wookey et al. | 707/10 |
| 2004/0221292 | A1 | 11/2004 | Chiang et al. | 719/310 |

OTHER PUBLICATIONS

R. Droms "RFC1541 Dynamic Host Configuration Protocol" *Request for Comments* www.cis.ohio-state.edu/htbin/rfc/rfc 1 541. html Oct. 1993 (retrieved Dec. 21, 1999).

R. Kowalchuk, R. Hilderman and H. Hamilton "vnews: A Multicast, Multimedia News Service with Virtual Messages" *Computers and Communications, 1996, Conference Proceedings of the 1996 IEEE 15th Annual International*, Mar. 1996.

Fricke, Stefan et al., "Agent Based Telematic Services and Telecom Applications" Communications of the AM, Apr. 2001, vol. 44, pp. 43-48.

Glenn, Ariel "Access Management of Web-Based Services" D-Lib Magazine, Sep. 1998, http://www.dlib.org/dlib/september98/millman/09millman.html, printed May 10, 2005, pp. 1-14.

Hoffman, Paul "Designs on Internet Mail," Putting it Together, Feb./Mar. 1998, pp. 19-23.

"Java Management API Architecture" Sun Microsystems, Inc., Part No.: 805-0084-01, Revision A, Sep. 1996, XP2264630.

"Sun Microsystems JavaBeans" Jul. 24, 1997, Version I, XP2956519.

W. R. Stevens, "TCP/IP Illustrated," Addison-Wesley, vol. 1, pp. 463-464.

D. Comer et al, "Internetworking with TCP/IP Client-Server Programming and Applications," vol. 3, p. 282.

http://dictionary.reference.com/search?q=segmented, printed Apr. 4, 2006.

* cited by examiner

REMOTE SERVICES SYSTEM SERVICE MODULE INTERFACE

CROSS REFERENCE TO RELATED APPLICATIONS

This application relates to co-pending U.S. patent application Ser. No. 10/185,557, filed on Jun. 27, 2002, entitled "Remote Services System Communication Module" and naming Michael J. Wookey, Trevor Watson and Jean Chouanard as inventors, the application being incorporated herein by reference in its entirety.

This application relates to co-pending U.S. patent application Ser. No. 10/186,073, filed on Jun. 27, 2002, entitled "Remote Services System Relocatable Mid Level Manager" and naming Michael J. Wookey, Trevor Watson and Jean Chouanard as inventors, the application being incorporated herein by reference in its entirety.

This application relates to co-pending U.S. patent application Ser. No. 10/185,558, filed on an even date herewith Jun. 27, 2002, entitled "Bandwidth Management for Remote Services System" and naming Michael J. Wookey, Trevor Watson and Jean Chouanard as inventors, the application being incorporated herein by reference in its entirety.

FIELD OF THE INVENTION

The present invention relates to remote service delivery for computer networks, and more particularly, to service module interface for use with a remote service delivery system.

BACKGROUND OF THE INVENTION

It is known to provide a variety of services that are delivered remotely to a customer. These services range from point solutions delivering specific service to more complex remote service instantiations supporting multiple services. The technology behind these services has a number of things in common: they are generally a good idea; they provide a valuable service to a set of customers; and, they are generally isolated from one another.

The number of remote services available show the need and demand for such services. However, the fragmentation of the services reduces the overall benefit to the service provider as well as to the customer. The customer is presented with an often confusing issue of which services to use, why the services are different and why the service provider cannot provide a single integrated service.

SUMMARY OF THE INVENTION

In accordance with the present invention, the invention relates to an apparatus for interfacing between a plurality of service modules and a remote services system which includes a service module application program interface. The service module application program interface provides an interface between the plurality of service modules and a remote services infrastructure. The service module application program interface is distributed within the remote services infrastructure.

In another embodiment, the invention relates to an apparatus for interfacing between a plurality of service modules and a remote services system. The remote services system includes an intermediate mid level manager, an applications mid level manager and an application server. The apparatus includes an intermediate mid level manager application program interface that is coupled to the intermediate mid level manager. An applications mid level manager application program interface is coupled to the applications mid level manager, and an applications server application program interface is coupled to the application server. The intermediate mid level manager application program interface allows the service modules to be loaded into the intermediate mid level manager. The applications mid level manager application program interface allows the service modules to be loaded into the applications mid level manager. The applications server application program interface allows the service modules to be loaded into the applications server.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
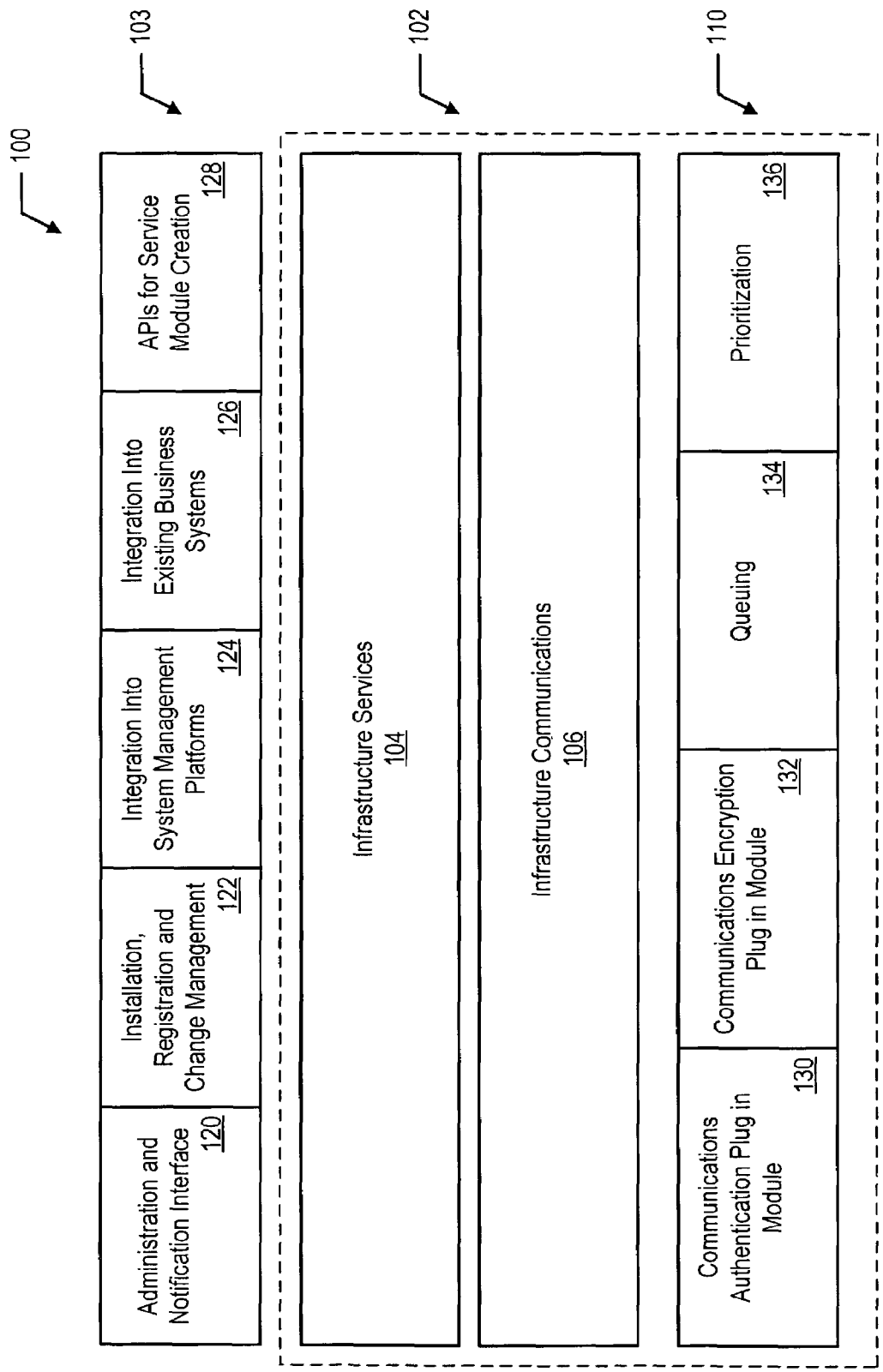
FIG. 1 shows a block diagram of a remote service delivery architecture.

FIG. 1 shows a block diagram of an architecture for a remote service delivery system 100 that meets the needs of both the service provider and the customer. The architecture of the present invention is modularized to provide broad support for both the customer and the service provider in terms of evolution of service functionality to the architecture and within the architecture.

The architecture is broadly comprised of the remote service infrastructure 102, a group of service modules 103 and a plurality of communications modules 110. The remote services infrastructure 102 provides reliable remote service delivery and data management. The remote services infrastructure 102 supports the needs of a service creator by focusing the service creator on the needs and the design of the service by eliminating the need for the service creator to be concerned about how data is transferred and managed to and from a customer site.

The remote services infrastructure 102 provides an interface to support the development of services that use a set of common service parameters to develop customized services for a specific service provider or customer. The infrastructure 102 is separately segmented from, but actively interacts with, the service modules 103.

Within the group of software modules 103 are individual software modules that analyze data collected by the remote services infrastructure 102 and provides service value based on that data to a customer. Thus, the remote services infrastructure 102 and the service modules 103 can be differentiated as follows: the remote services infrastructure 102 is concerned with how data is collected, while the service module 103 is concerned with what is done with the data.

The remote services infrastructure 102 includes an infrastructure services portion 104 and an infrastructure communications portion 106. The infrastructure services portion 104 interacts with the plurality of service modules 103, as described in greater detail below. The remote services infrastructure 102 provides a set of application program interfaces (API's) that are used by a service module developer to leverage common services of the infrastructure such as database access, software delivery and notification services. The infrastructure communications portion 106 includes a plurality of communications modules 110.

The infrastructure services portion 104 interacts with a plurality of service modules 103. Examples of service modules that the remote services architecture may include are an administration and notification interface module 120, an installation, registration and change management module 122, an integration into system management platforms module 124, an integration into existing business systems module 126 and an API's for service module creation module 128. The administration and notification interface 120 allows a customer and service provider to control the remote services infrastructure. The installation, registration and change management module 122 supports the infrastructure and service modules deployed on top of the infrastructure. The module 122 may include automatic registration of new software components, delivery of software and detection of changes within an environment. The integration into systems management platforms module 124 provides an integration point to systems management platforms in general. The integration into existing business systems module 126 allows the remote services infrastructure 102 to integrate into existing business systems to leverage data, processing capacities, knowledge and operational process. The module 126 allows the infrastructure 102 to integrate into the required business systems and provides interfaces to the service module creator to use those systems. The API's for service module creation module 128 allows a service module creator to abstract the complexity of remote data management. The module 128 provides an API of abstracted services to the service module creator.

The infrastructure communications portion 106 provides an abstraction of different protocol and physical network options. Examples of protocol options include an HTTP protocol and an email protocol. Examples of physical network options include Internet based communications, private network based communications and fax communications. The different protocol and physical network options are provided to meet the needs of as many customers as possible.

The infrastructure communications portion 106 supports a number of plug-in communications modules 110. Examples of the communications modules 110 include a communications authentication module 130, an encryption module 132, a queuing module 134, and a prioritization module 136. The communications authentication module 130 is related to the communications protocol that is used and provides the customer with authentication of a communication session. The encryption module 132 is related to the protocol being used and provides encryption of the data stream. The queuing module 134 provides the ability of the infrastructure to queue data being sent through the infrastructure to provide data communications integrity. The prioritization module 136 provides the ability for data within the system to be prioritized for delivery.

Figure 2:
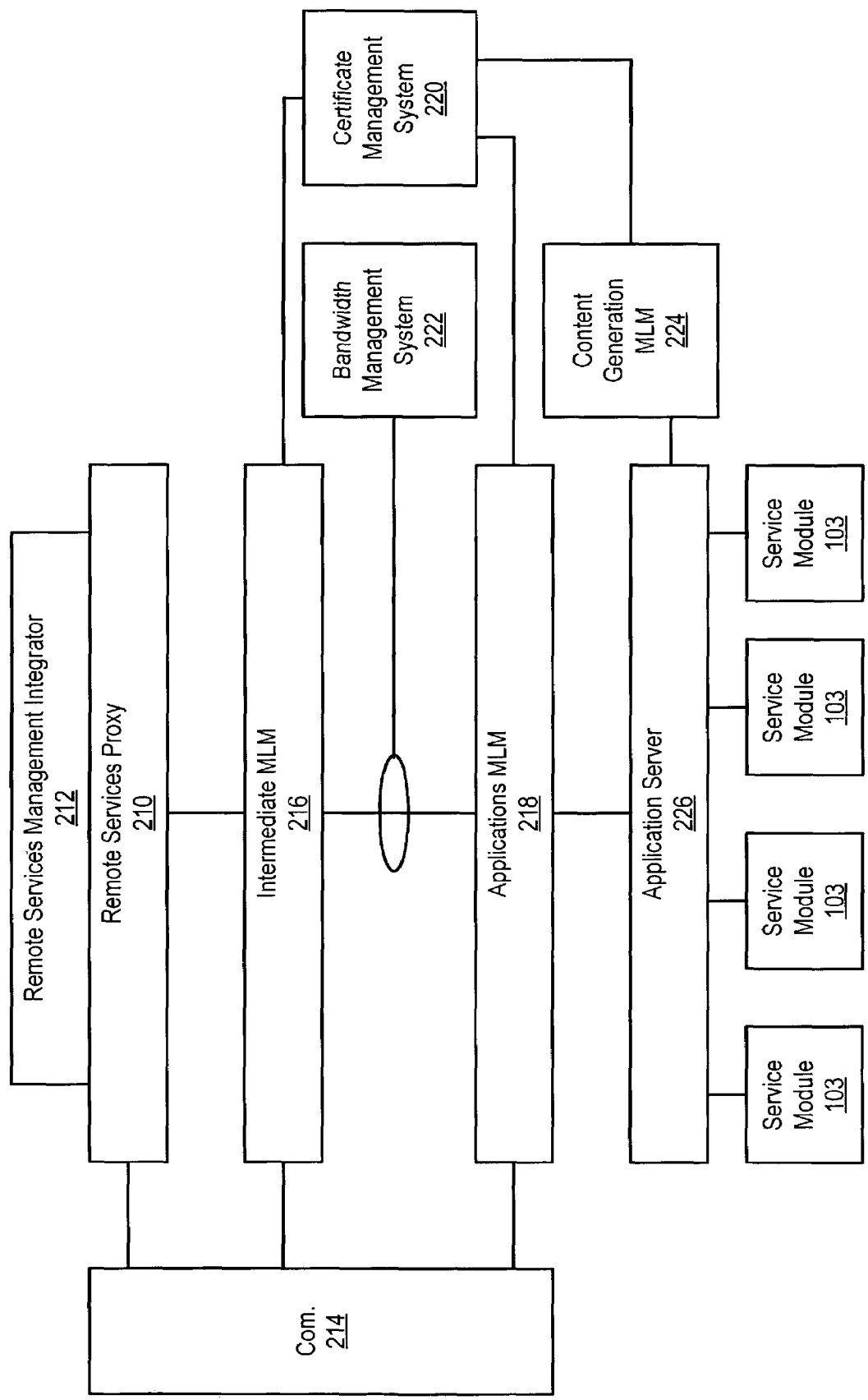
FIG. 2 shows a schematic block diagram of the components relating to the remote services infrastructure.

Referring to FIG. 2, the remote services infrastructure architecture 205 includes a plurality of components. More specifically, the remote services infrastructure architecture 205 includes a remote services proxy 210, a remote services system management integrator 212, a remote services communications module 214, an intermediate mid level manager (MLM) 216 (which may be a customer MLM or an aggregation MLM), an applications MLM 218, a certificate management system 220, a bandwidth management system 222, a remote services content generation MLM 224, a remote services application server 226. The remote services infrastructure architecture 205 interacts with a plurality of external service modules 103.

The remote services proxy 210 provides an API to the systems management systems. This API supports data normalization to the remote services data format. The remote services proxy 210 also provides receptors for the communications modules and in turn provides communications flow management using queuing. The remote services proxy 210 also manages allocation of remote services identifiers (ID's), which are allocated to each component of the remote services infrastructure, and the support instances that are registered with the remote services system 100.

The remote services system management integrators 212 are written to a remote services integrator API supported by the remote services proxy 210. One remote services proxy 210 can support many integrators (also referred to as integration modules). The integration modules provide the glue between the remote services system 100 and the systems management platform. There is at least one integration module for each support systems management platform.

The remote services communications modules 214 provide protocol, encryption and communications authentication. These modules plug-in through a semi-private interface into the remote services proxy 210, the intermediate MLM 216 and the remote services application MLM 218.

The intermediate MLM 216 may be either a customer MLM or an aggregation MLM. The remote services customer MLM is an optional deployable component. The remote services customer MLM provides a higher level of assurance to the customer-deployed environment, providing transaction integrity, redundancy and data queue management. The remote services customer MLM also provides an extensible environment through an API where service module components can be deployed. When no customer MLM is deployed, the aggregation MLM, hosted by the remote services provider and handling multiple customers, provides the data queue management, transaction integrity and redundancy. While the customer MLM is very similar to an aggregation MLM, a customer MLM may be required by a service module that needs to be localized. An aggregation MLM, being shared by multiple customers, may not be customizable.

The applications MLM 218 provides a series of functions that can exist on different MLM instantiations as applicable. The applications module provides data normalization, integration with the mail server data flow and integration with the certificate management system 220. This module acts as the gateway to the remote services application server 226 and controls data access.

The certificate management system 220 provides management of certificates to verify connection authentication for the remote services system 100. The certificate management system 220 may be horizontally scaled as necessary to meet the load or performance needs of the remote services system 100.

The bandwidth management system 222 provides control over bandwidth usage and data prioritization. The bandwidth management system 222 may be horizontally scaled as necessary to meet the load or performance needs of the remote services system 100.

The remote services content generation MLM 224 provides HTML content based on the data held within the remote services application server 226. This module provides a high level of HTML caching to reduce the hit rate on the application server for data. Accordingly, visualization of the data is done through the content generation MLM 224. Separating the visualization processing in the content generation MLM 224 from the data processing in the applications server 226 provides two separate scale points.

The remote services application server 226 provides the persistent storage of remote services infrastructure information. The application server 226 also provides the data processing logic on the remote services infrastructure information as well as support for the service module API to create service module processing within the application server 226. The application server 226 provides access to directory services which support among other things, IP name lookup for private network IP management. The application server 226 also provides access to the service modules 103.

In operation, the remote services proxy 210 uses the communication module 214 to connect to the intermediate MLM 216, whether the intermediate MLM is a customer MLM or an aggregation MLM. The applications MLM 218 and the intermediate MLM 216 use the certificate management system 220 to validate connections from customers. Dataflow bandwidth between the intermediate MLM 216 and the applications MLM 218 is controlled by the bandwidth management system 222. Data that has been formatted by the applications MLM 218 is sent on to the application server 226 for processing and persistent storage.

The content generation MLM 224 provides visualization and content creation for users of the remote services system 100. Remote services infrastructure administration portal logic is deployed to the content generation MLM 224 to provide users of the remote services system 100 with the ability to manage the remote services system 100.

All of the remote services components are identified by a unique remote services identifier (ID). A unique customer remote services ID is generated at customer registration. For remote services infrastructure components, remote services IDs are generated, based on the customer remote services ID, at a component registration phase. For remote services entities reporting to a remote services proxy 210, such as a support instance or an integration module, the remote services ID is allocated by the proxy 210 itself, based on the remote services ID of the proxy 210.

Within the remote services architecture, there are instances where detection, collection and management logic (also referred to as systems management logic) may have already been created by another service module. In this instance, the service module creator reuses this functionality. The reuse then creates a more complex relationship within the system to be managed. The segmentation and re-use of data is available within the architecture. Instrumentation is made up of a large number of small data types. These data types are shared by the different service modules 103 using a publish and subscribe model.

Figure 3:
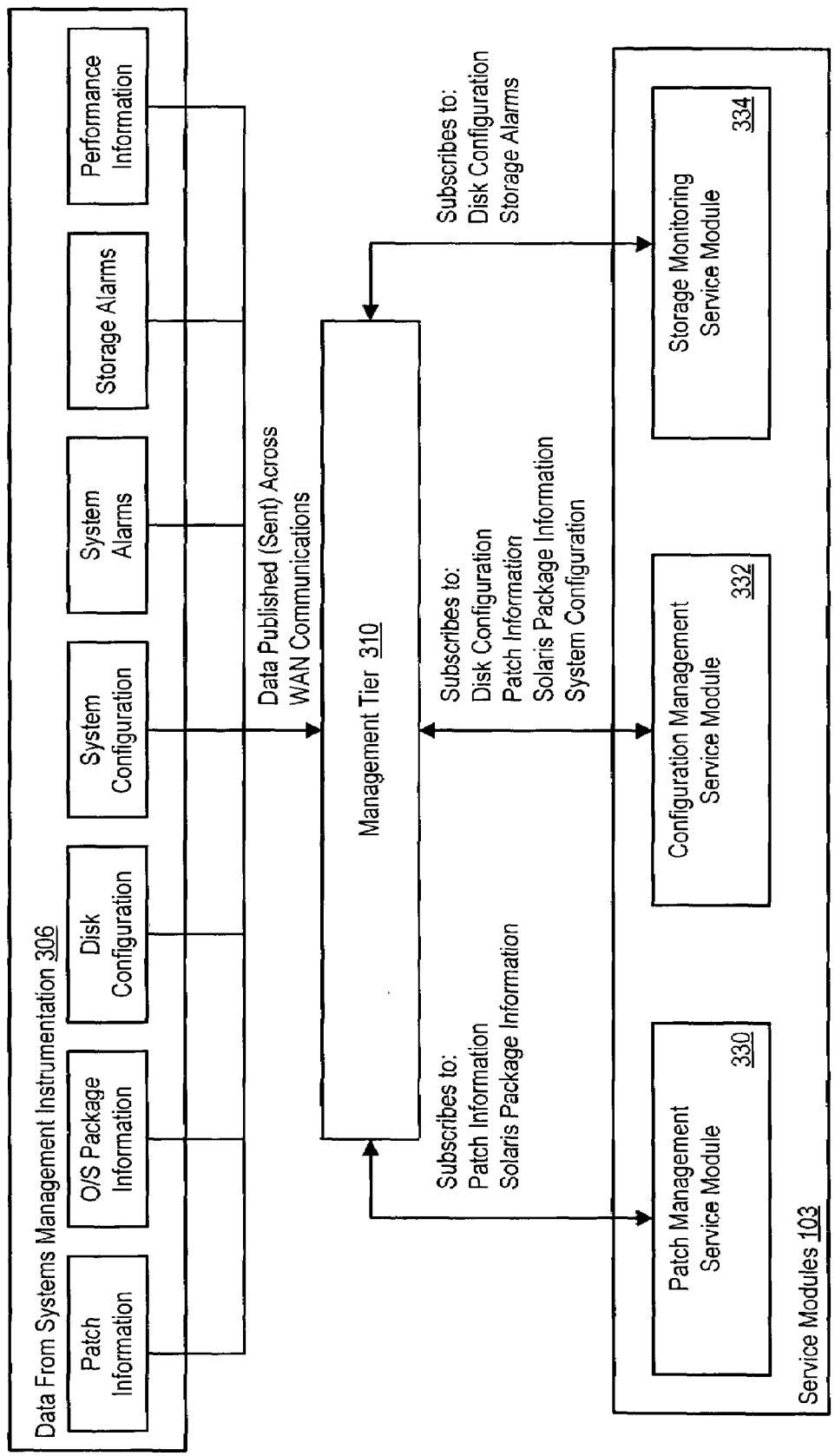
FIG. 3 shows a publish and subscribe example using the remote services delivery architecture.

In a publish and subscribe model, the remote services proxies (and therefore the systems management systems) publish their data to a service provider. The service modules 103 register interest in specific types of data that are needed to fulfill the respective service module processing. FIG. 3 provides an example of the publish and subscribe model using example data and services.

More specifically, data from a systems management instrumentation proxy 306 may include patch information, operating system package information, disk configuration information, system configuration information, system alarms information, storage alarms information and performance information. This information is published via, e.g., a wide area network (WAN) to a management tier 310. Various service modules 103 then subscribe to the information in which they are respectively interested. For example, a patch management service module 330 might be interested in, and thus subscribe to, patch information and operating system package information. A configuration management service module 332 might be interested in, and thus subscribe to, the disk configuration information, the patch information, the operating system package information and the system configuration information. A storage monitoring service module 334 might be interested in, and thus subscribe to, disk configuration information and storage alarms information.

Thus, with a publish and subscribe model, many different types of data are published by a customer using the remote services customer deployed infrastructure. Service modules then subscribe to these data types. More than one service module 103 can subscribe to the same data. By constructing the instrumentation data in a well segmented manner, the data can be shared across many services.

Sharing data across many services reduces duplication of instrumentation. By making data available to newly developed service modules, those service modules need to only identify instrumentation that does not exist and reuse and potentially improve existing instrumentation. Sharing data across multiple services also reduces load on customer systems. Removing the duplication reduces the processing load on the customer's systems. Sharing data across multiple services also reduces development time of service modules 103. As more instrumentation is created and refined, service modules 103 reuse the data collected and may focus on developing intelligent knowledge based analysis systems to make use of the data.

Accordingly, the separation and segmentation of the infrastructure from the service modules enables services to be created in a standardized manner ultimately providing greater value to the customer.

Figure 4:
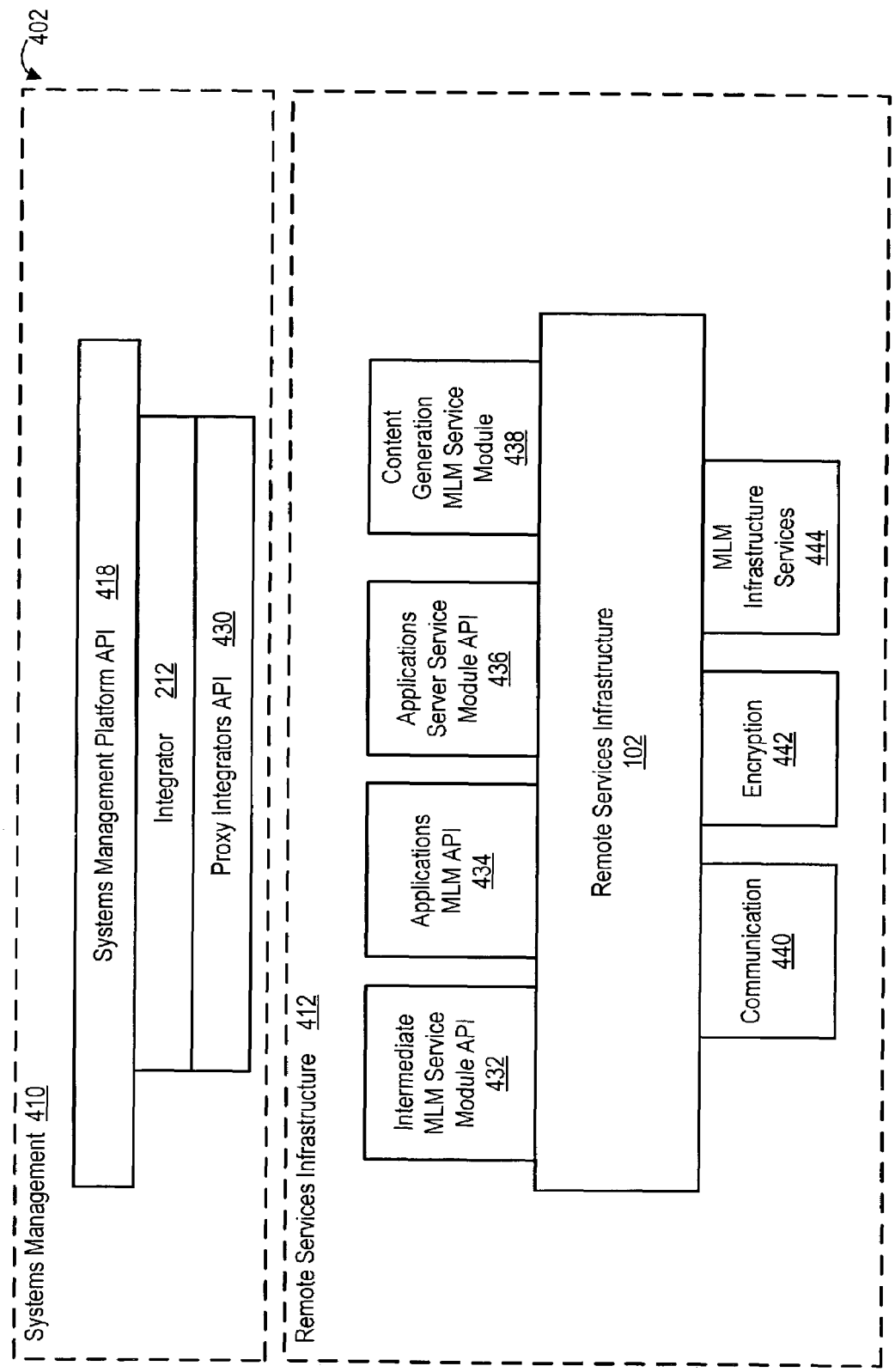
FIG. 4 shows a block diagram of the application program interfaces (API's) of the remote service delivery architecture.

Referring to FIG. 4, the remote services architecture includes a remote services API 402 which may be conceptualized in two areas, systems management API's 410 and remote services infrastructure API's 412.

The systems management API's 410 includes systems management API's 418, integrator 212 and proxy integrators API 430. The proxy integrator API 430 interfaces with integrator module service logic. The integrator module service logic is a general term for the configuration rules that are imparted on the systems management system to collect or detect the information for the integrator 212. While the proxy integrator API's 430 are not technically a part of the remote services system 100, the proxy integrator API 430 is used within the integration modules which form the boundary between the remote services system 100 and the system management. The integration module creator provides the instrumentation to fulfill the collection and detection needs of the service via the systems management API 418.

The proxy integrators API 430 provides an interface between the systems management system and the remote services infrastructure 102. This interface provides a normalization point where data is normalized from the system management representation to a remote services standard. By normalizing the data, the remote services system 100 may manage similar data from different systems management systems in the same way. The proxy integrators API 430 interfaces with the remote services proxy 210 as well as the systems management integrator 212.

The remote services infrastructure API's are used by a service module creator and the systems management integrator 212. The remote services infrastructure API's 412 include an intermediate MLM service module API 432, an applications MLM service module API 434 and an applications server service module API 436 as well as a content generation MLM service module API 438. These API's provide the interface with the remote services infrastructure 102.

The intermediate MLM Service Module API 432 describes a distributed component of the infrastructure. The intermediate MLM service module API 432 allows modules to be loaded into this distributed component that provides mid data stream services such as data aggregation, filtering, etc. The intermediate MLM service module API 432 provides access and control over the data that flows through the intermediate MLM 216 to the service module provider. The intermediate MLM service module API 432 allows intercept of data upstream and on the back-channel to mutation, action and potential blocking by the service modules 103. The intermediate MLM service module API 432 interfaces with a service module creator as well as with the intermediate MLM 216 and intermediate MLM based service modules.

The applications MLM API 434 allows additional modules to be loaded on the applications MLMs. The applications MLM API 424 allows modules to be built into the applications MLMs 218 such as data normalization. The applications MLM API 424 interfaces with the applications MLMs 218 and modules within the applications MLM 218.

The applications server service module API 436 provides all of the needs of a data processing service module. The applications server service module API 436 provides access to many functions including data collected through a database and access to a full authorization schema. The applications service module API 436 is based around the J2EE API. The applications service module API 436 provides a rich interface for service module creators to interact with and build services based on Enterprise Java Beans (EJB's) and data available to them. The application server service module API 436 interfaces with the remote services application server 226 and the service modules 103.

The content generation MLM API 438 is based around the J2EE web container and provides the service module creator a way of building a browser based presentation. The content generation API 428 interfaces with the content generation MLM 224 as well as with MLM generation based service modules.

The remote services infrastructure API's 412 also include a plurality of communication interfaces which are based around the extendibility of the remote services communications system. The communication interfaces include a communication protocol module 440, a communication encryption module 442 and an MLM infrastructure services portion 444. The communications interfaces interface with the remote services proxy 210 as well as all of the remote services system MLM's. The communications interfaces provide an interface between the communications modules and the components that use the communications modules.

The communications protocol module 440 provides support of the application level protocol that is used for the communication through the system. Modules of this type interface to support the use of Email and HTTP communications protocols. The communication protocol module 440 interfaces with remote services communications engineering personnel.

The communications encryption module 442 supports plug-in encryption modules. The plug-in encryption modules can either provide encryption at the protocol level or encryption of the data within the protocol. The communication encryption module 442 interfaces with remote services communications engineering personnel.

The MLM infrastructure services portion 444 represent a number of services that are included within the MLM that provide services that are relevant to the infrastructure 102. These services manage and manipulate the data as it passes through the different parts of the architecture. These services, such as queuing, utilize an API to access and manipulate the API.

Figure 5A:
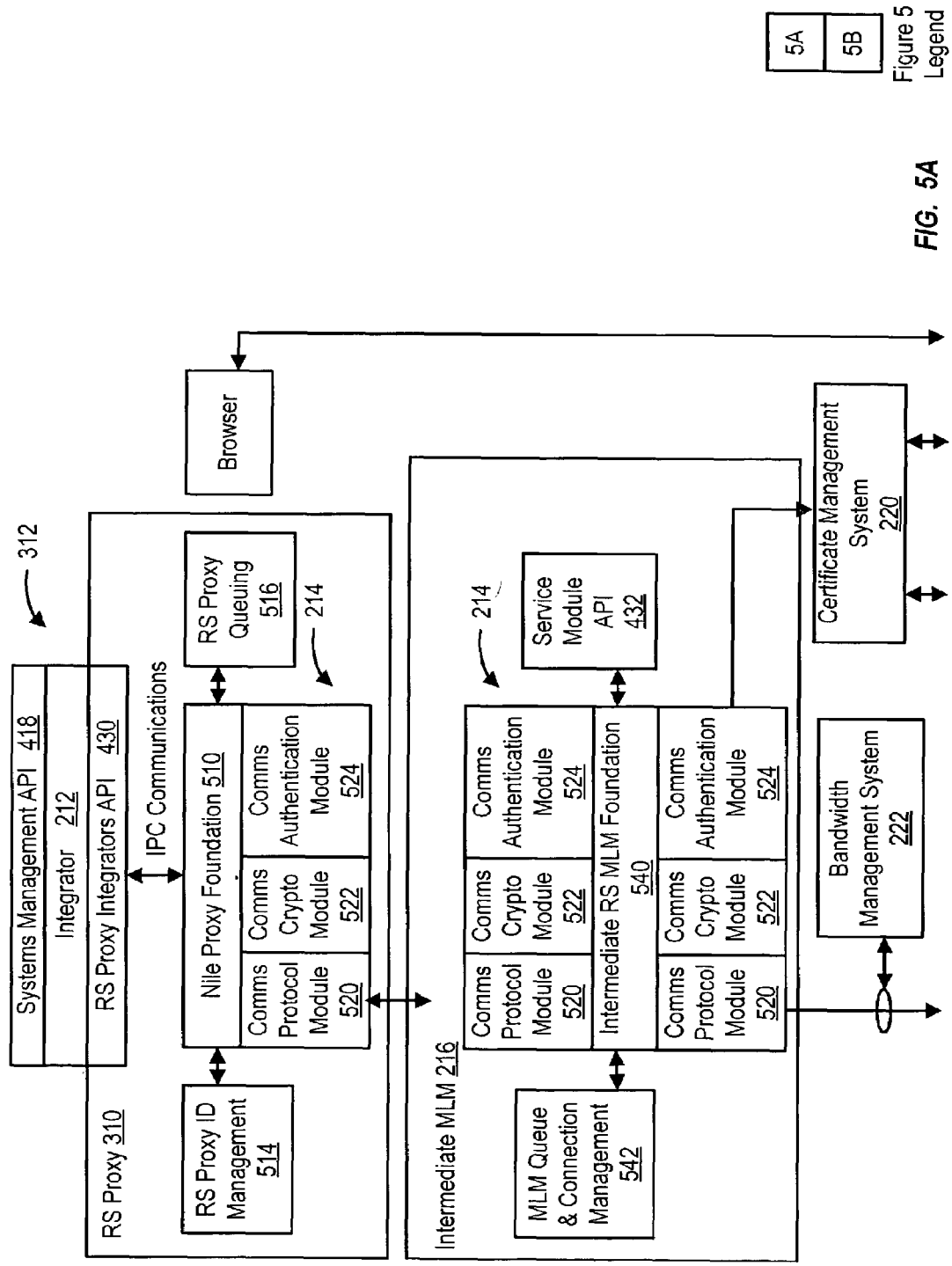
FIGS. 5A and 5B show a more detailed version of the components of FIG. 2.
Figure 5B:
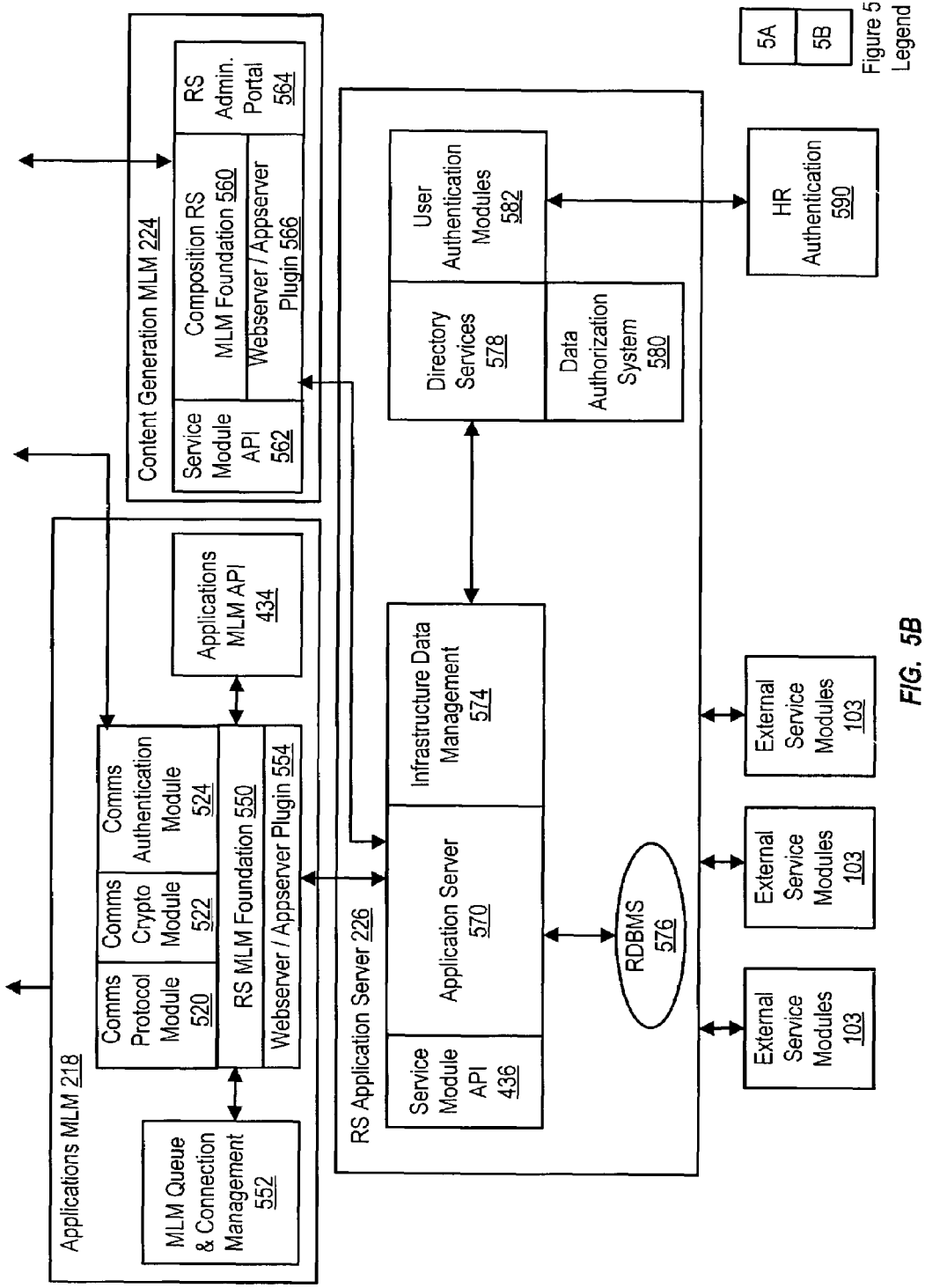

FIGS. 5A and 5B show a more detailed block diagram of the remote services architecture depicted in FIG. 2. Within this more detailed block diagram, the remote services communications modules 214 are shown distributed across the remote services proxy 210, the intermediate MLM 214 and the applications MLM 218.

The remote services proxy 210 includes a remote services proxy foundation module 510 which is coupled to a communications module 214 as well as to a remote services proxy integrator API module 430, a remote services proxy ID management module 514 and a remote services proxy queuing module 516.

The remote services system management integrator 212 includes a systems management API 418 and a remote services integrator 212. The remote services integrator 212 is coupled to the remote services proxy integrators API module 430 of the remote services proxy 210.

Each communication module 214 includes a communications protocol module 520 and a communications crypto module 522. A communications module 214 may also include a communications authentication module 524.

The intermediate MLM 216 includes an intermediate remote services MLM foundation module 540 which is coupled between communication modules 214. The intermediate remote services MLM foundation module 540 is also coupled to a MLM queue and connection management module 542 and an intermediate service module API module 432. Communications modules 214 couple the intermediate MLM 216 to the remote services proxy 210 and the applications MLM 218.

Bandwidth management system 222 controls bandwidth usage and data prioritization on the communications between intermediate MLM 216 and applications MLM 218. Certificate management system 220 is coupled between the communications authentication modules 524 for the intermediate MLM communications module 214 and the applications MLM 218 communications module 214.

The applications MLM 218 includes a remote services MLM foundation module 550 that is coupled to the communications module 214 for the applications MLM 218. The remote services MLM foundation module 550 is also coupled to an MLM queue and connection management module 552 and the applications MLM API module 434 as well as a web server application server plug-in module 554.

Content generation MLM 224 includes a composition MLM foundation module 560. The composition MLM foundation module 560 is coupled to a service content generation module API module 438 and a remote services administration portal 564 as well as a web server application server plug-in module 566.

Remote services application server 226 includes an application server module 570 coupled to an application server service module API 436 and an infrastructure data management module 574. The application server module 570 is also coupled to relational database management system (RDBMS) 576. The infrastructure data management module 574 is coupled to a directory services module 578. The directory services module 578 is coupled to a data authorization system module 580 and user authentication modules 582. The user authentication modules 582 are coupled to human resources (HR) authentication module 590. The remote services application server 226 is coupled to a plurality of external service modules 230.

FIGS. 6, 7, 8, 9 and 10 show expanded views of the remote services proxy 210 and remote services system management integrator 212, intermediate MLM 216, applications MLM 218, applications server 226 and content generation MLM 224, respectively.

Figure 6:
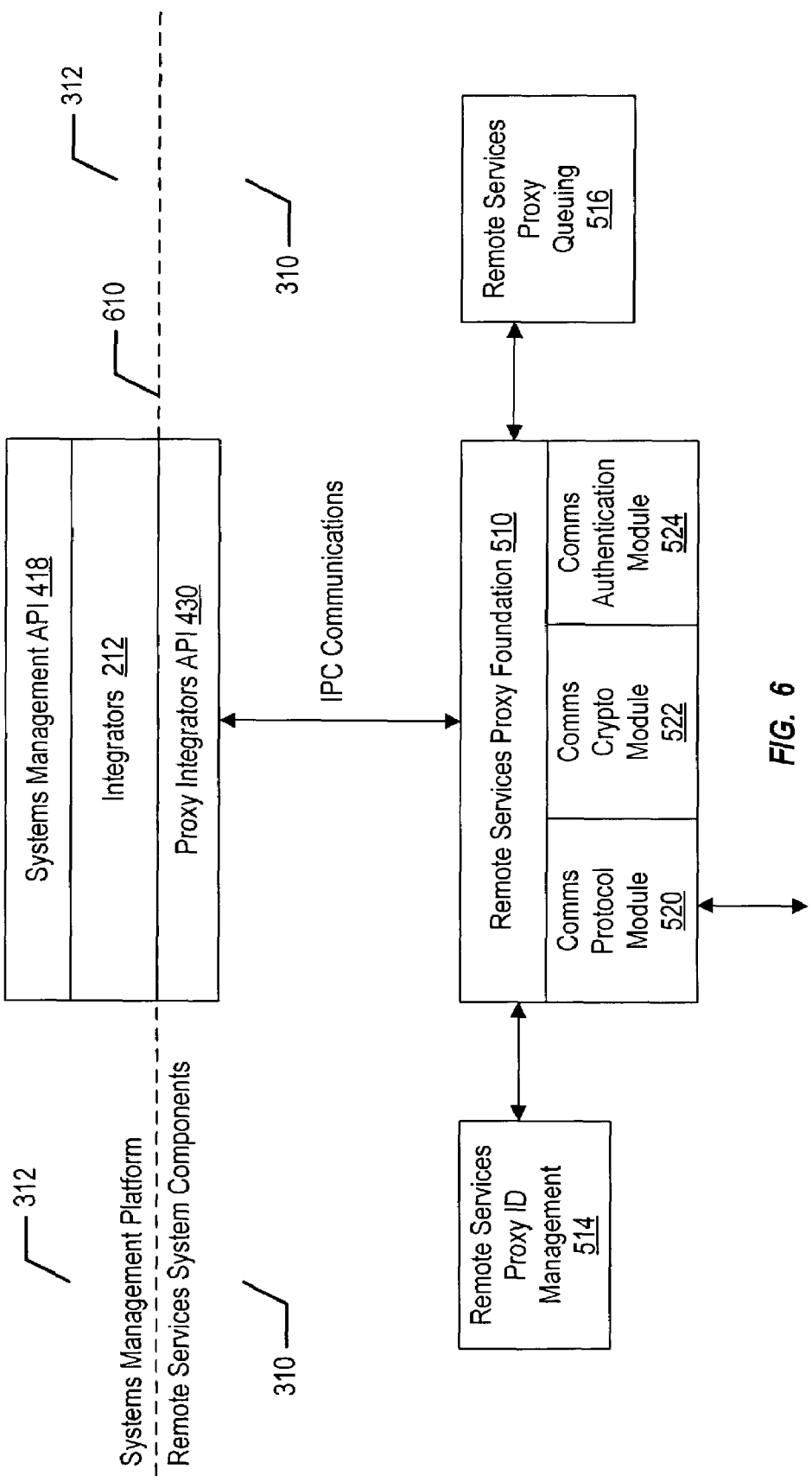
FIG. 6 shows a block diagram of a remote services proxy and a remote services system management integrator.

FIG. 6 shows a block diagram of the remote services proxy 210 and the remote services system management integrator 212. The block diagram shows the delineation between the systems management software and the remote services system components as indicated by line 610.

The remote services proxy 210 provides an API via remote services proxy integrators API 430 which communicates using the operating system's Inter-Process Communication (IPC) implementation with the remote services proxy foundation module 510. This communication allows the API to be implemented with a number of different languages to meet the needs of the systems management developers while leaving a single native implementation of the remote services proxy foundation module 510. Examples of the languages used for the API include Java and C++.

The remote services proxy foundation module 510, together with the API 430, manage data normalization tasks. This ensures that systems management data is carried independently through the system. For example, an event from one type of service, such as a SunMC service, would have the same structure as an event from another type of service, such as the RASAgent service. Accordingly, the service modules may deal with the data types that are specific to the respective service and are independent of their source.

In the remote services architecture, the integrator 212 and proxy 210 are represented by two separate processes (e.g., address spaces). By representing the integrator 212 and the proxy 210 as two separate processes, a faulty integrator 212 is prevented from taking down the whole proxy 210.

The remote services proxy queuing module 516 allows data to be queued for transmission when communications to the intermediate MLM(s) 216 become unavailable. This queuing is lightweight and efficient which in turn reduces the capabilities of length of time data can be queued and of reconnection management. The remote services proxy queuing module 516 provides a number of features that can be used to manage the queue, such as priority and time for data to live.

The remote services proxy ID management module 514 manages the allocation of unique identifiers for the proxy 210 itself and any support instances that are registered through the API. The remote services system 100 relies on the creation of unique ID's to manage individual support instances. This function is provided within the proxy 210 because there is no unique cross platform identifier available within the remote services system 100. The proxy 210 manages the mapping between the systems management ID (e.g., IP address) and the remote services ID, which is keyed off the unique customer ID provided at installation time within the deployed system.

Figure 7:
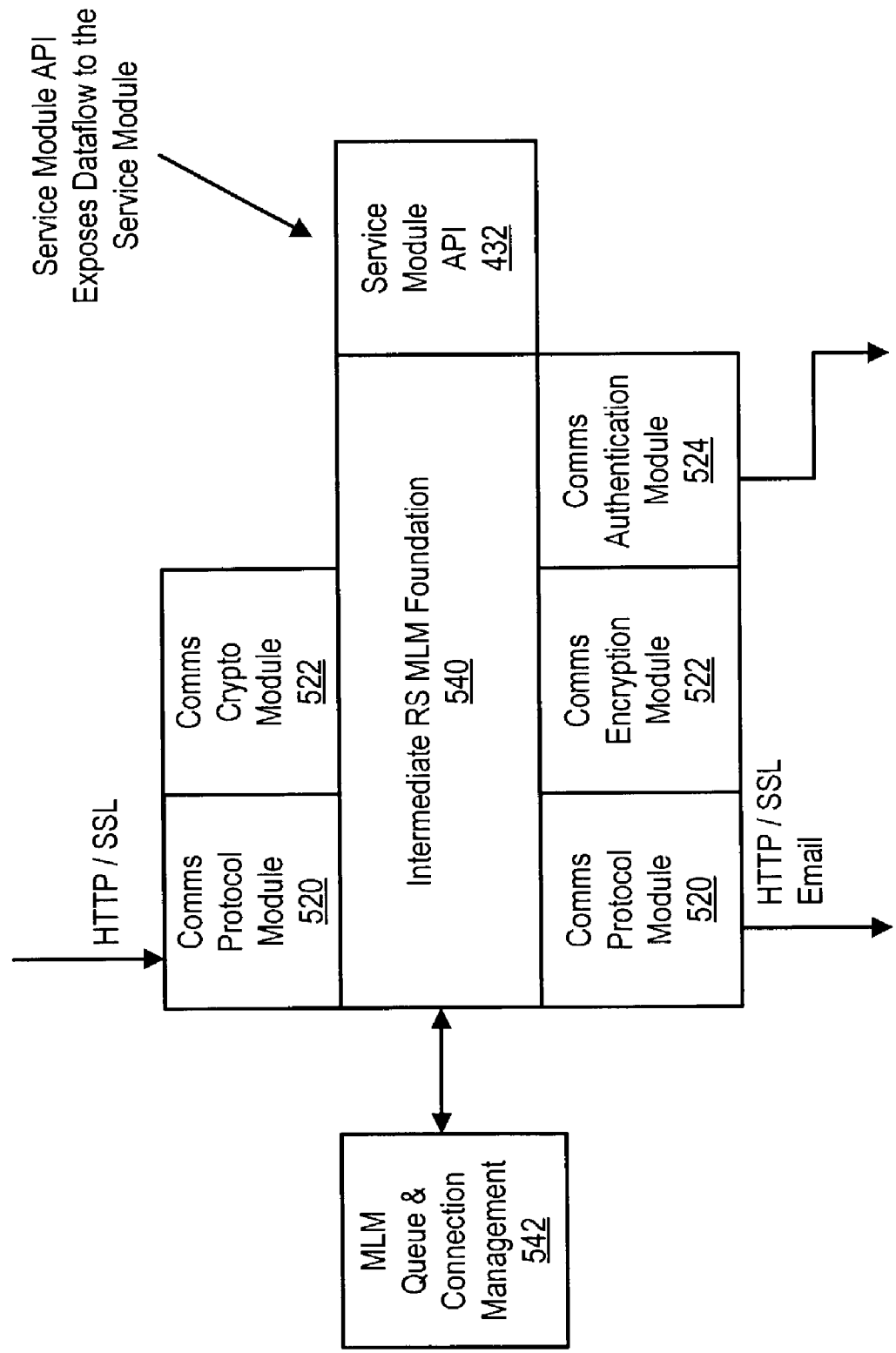
FIG. 7 shows a block diagram of a remoter services intermediate mid level manager (MLM).

FIG. 7 shows a block diagram of the remote services intermediate MLM 216. The intermediate MLM may be a customer MLM or an aggregation MLM.

The customer MLM is an optional component that can be deployed to support scaling of both support instances and services as well as provide enhanced availability features for a deployed remote services environment. The intermediate MLM 216 receives information via the HTTP protocol from the remote services proxy 210. This information may optionally be encrypted. Connections are not authenticated by default on the server side, as it is assumed that the connection between the intermediate MLM 216 and the proxy 210 is secure.

The intermediate remote services MLM foundation module 540 exposes the data flow to the service module API 432 where registered service modules can listen for new data of specific types and mutate the data as required. Examples of this function include filtering of certain types of data or data aggregation. The customer MLM does not keep state from an infrastructure perspective. However, the service module could choose to keep persistent state information. The recoverability fail-over support of that state, however, is in the domain of the service module, although the basic session replication features that provide the redundancy features of the infrastructure data flow may be reused.

The queue and connection management module 542 provides a highly reliable secure connection across the wide area network to the service provider based MLM farms. The queue manager portion of module 542 also manages back-channel data that may be intended for specific remote services proxies as well as for the applications MLM 218 itself.

The intermediate remote services MLM foundation module 540 manages the rest of the MLM's roles such as session management, fail-over management and shared queuing for the back-channel.

Aggregation MLM's, while provided by the service provider, function much the same as customer MLM's. Strong security is turned on by default between such MLM's and the remote services proxy 210. Accordingly, a communications authentication module 524 is used on the receiving portion of the intermediate MLM 216.

Figure 8:
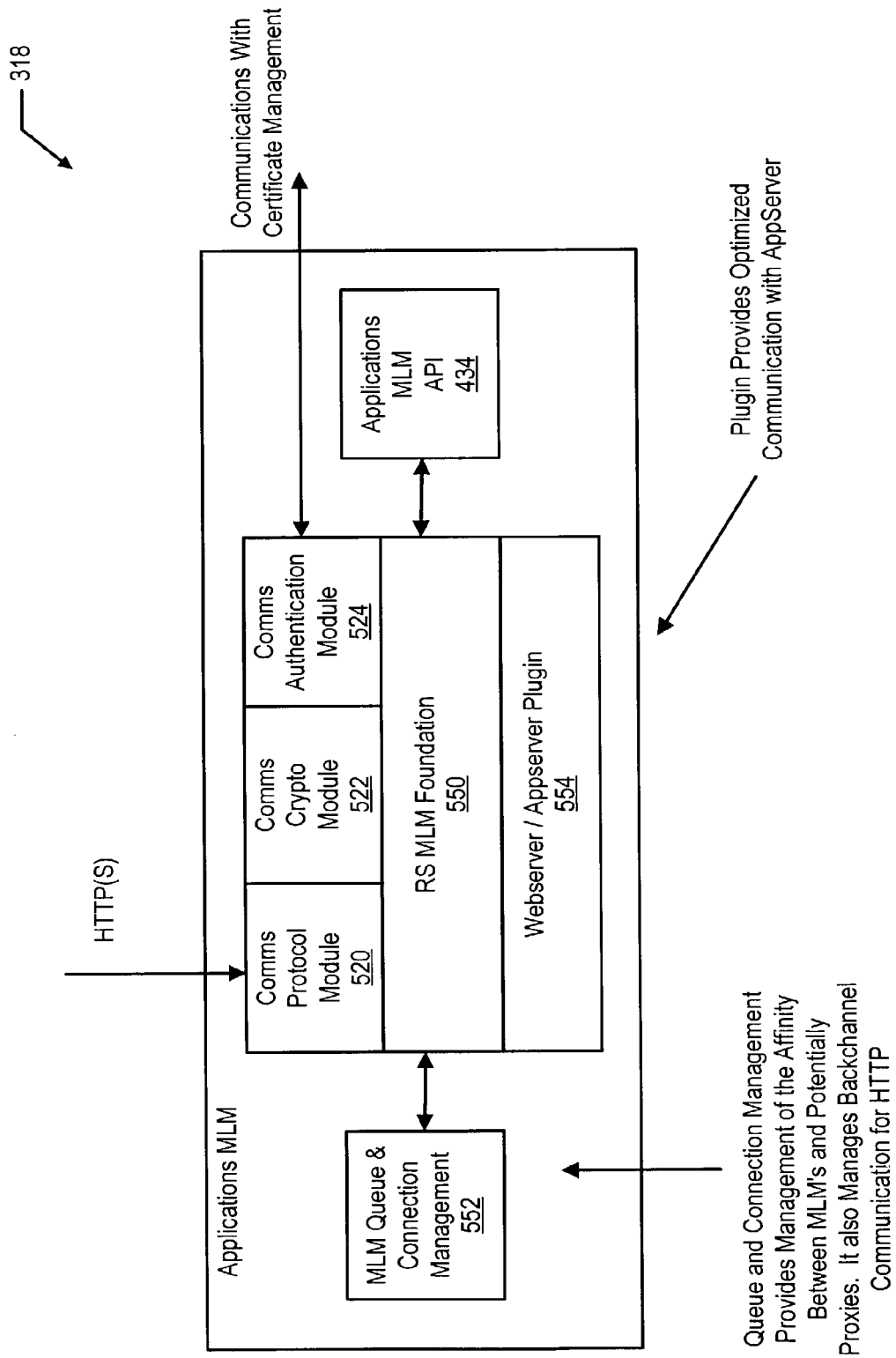
FIG. 8 shows a block diagram of a remote services applications MLM.

Referring to FIG. 8, the remote services application MLM 218 provides several functions (applications) for the remote services system 100. The remote services application 218 hosts applications as well as functioning as a content creation MLM. The host applications within the application MLM 218 include data normalization, customer queue management and remote access proxy. The data normalization application supports normalization and formatting of data being sent to the application server 226. The customer queue management application handles general connections to and from customer remote services deployments. The customer queue management application also manages back-channel requests and incoming request. The remote access proxy application provides a remote access point as well as functioning as a shared shell rendezvous point. The applications MLM 218 uses the application server plug-in to communicate directly with the application server 226.

The communications authentication module 554 communicates with the certification management system 220 to validate incoming connections from customers. Each customer is provided a certificate by default although more granular allocations are available. Certificates are distributed at installation time as part of the installation package for both the remoter services proxy module and for the remoter services customer MLM.

Figure 9:
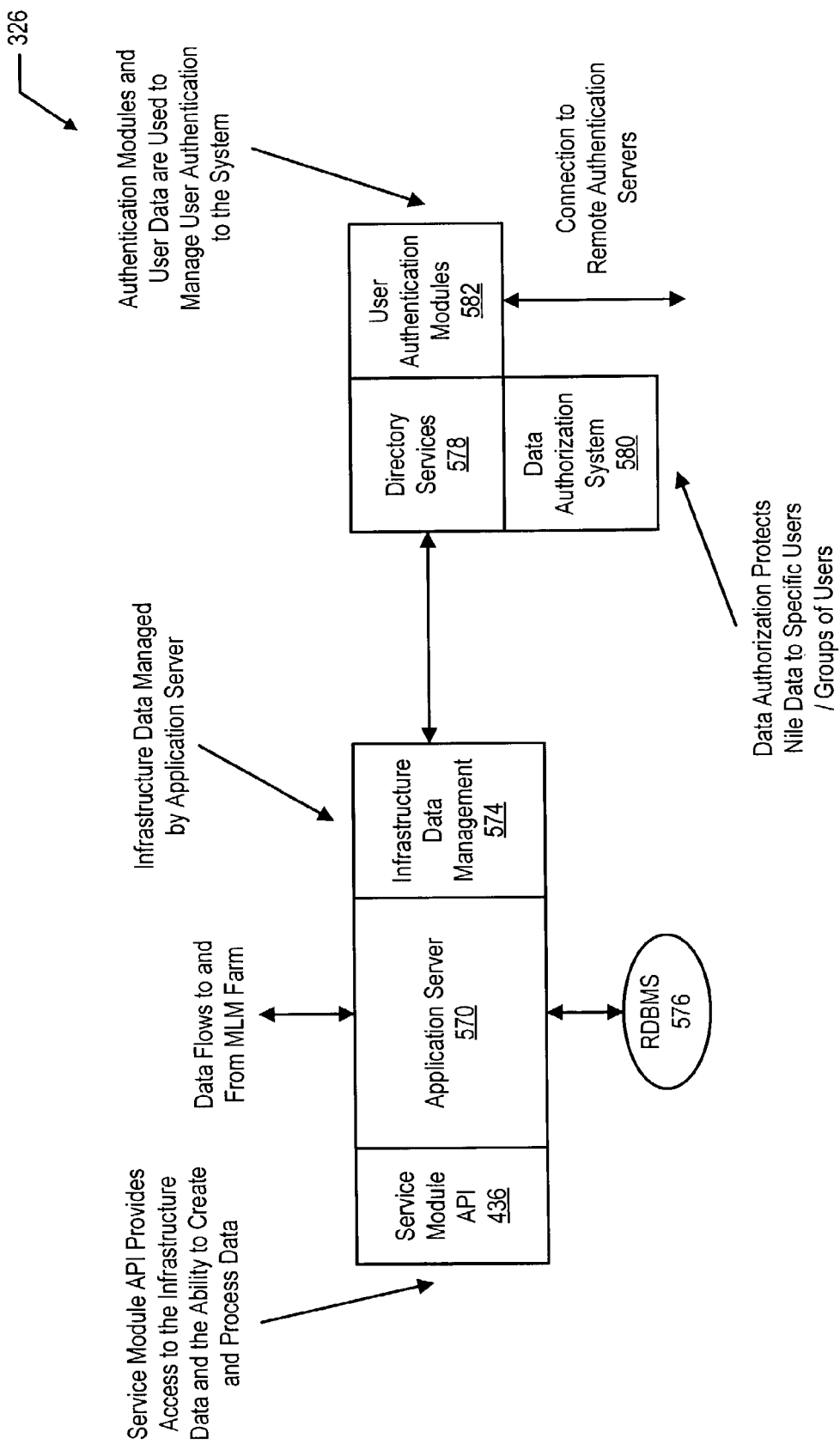
FIG. 9 shows a block diagram of an application server module.

Referring to FIG. 9, the application server 226 manages the persistence and data processing of the remote services infrastructure 102 and the service modules 103.

The application server 226 provides the core service module API 436 to the service module creator. The service module API 436 is based upon the J2EE API. The service module API 436 allows the service module creator to register for certain types of data as the data arrives and is instantiated. This data can then be processed using the support of the application server 226 or alternatively exported from the remote services system 100 for external processing.

The infrastructure data is held within the application server 226 and stored within the RDBMS 576 associated with the application server 226. Access to this data is available via the service module API 436 and is managed via the infrastructure data management module 574.

The directory services implementation supports user authentication, data authorization and private network data support. User authentication uses a pluggable authentication module (PAM) so support a plurality of authentication methods such as a lightweight directory assistance protocol (LDAP) method for service provider employees and a local login method for a remote services based login schema. Other methods may be added. The LDAP login is processed using a replicated copy of an LDAP server running within the remote services infrastructure 102.

Data authorization is designed to protect the data held within the application server 226 to specific groups of users. This protection allows customers to grant or deny access to their service data to specific users. This data protection is managed down to the service module granularity. So for example, a customer could grant information about advanced monitoring on a subset of their support instances to members of a service provider monitoring staff.

Figure 10:
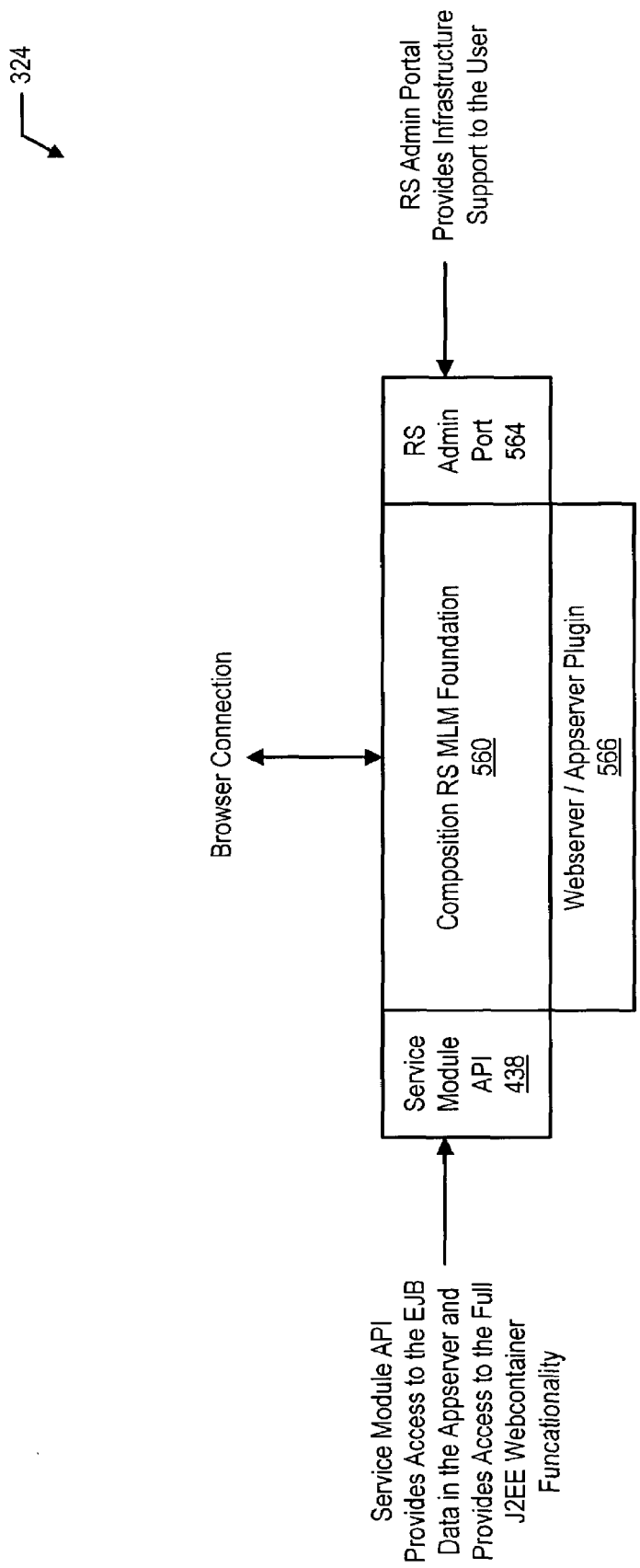
FIG. 10 shows a block diagram of a content generation MLM module.

Referring to FIG. 10, the remote services content generation MLM 224 provides HTML generation bases on the data held within the application server 226. The content generation MLM 224 provides a service module API 438 for service module creators to develop content composition for their data which is processed by the application server 226. The content is in the form of J2EE web container which supports Java servlets and Java servlet pages (JSP) API's.

The content generation MLM 224 communicates with the application server 226 using the same Netscape API (NSAPI) plug-in as the remote services applications MLM 218. Instances of these two MLMs make up an MLM farm.

The composition remote services foundation layer provides support for caching of HTML pages and associated data to reduce the data request hit back to the application server 226.

The remote services administration portal 564 provides control of the deployed customer infrastructure to the customer and control over the total infrastructure to trusted users.

Figure 11:
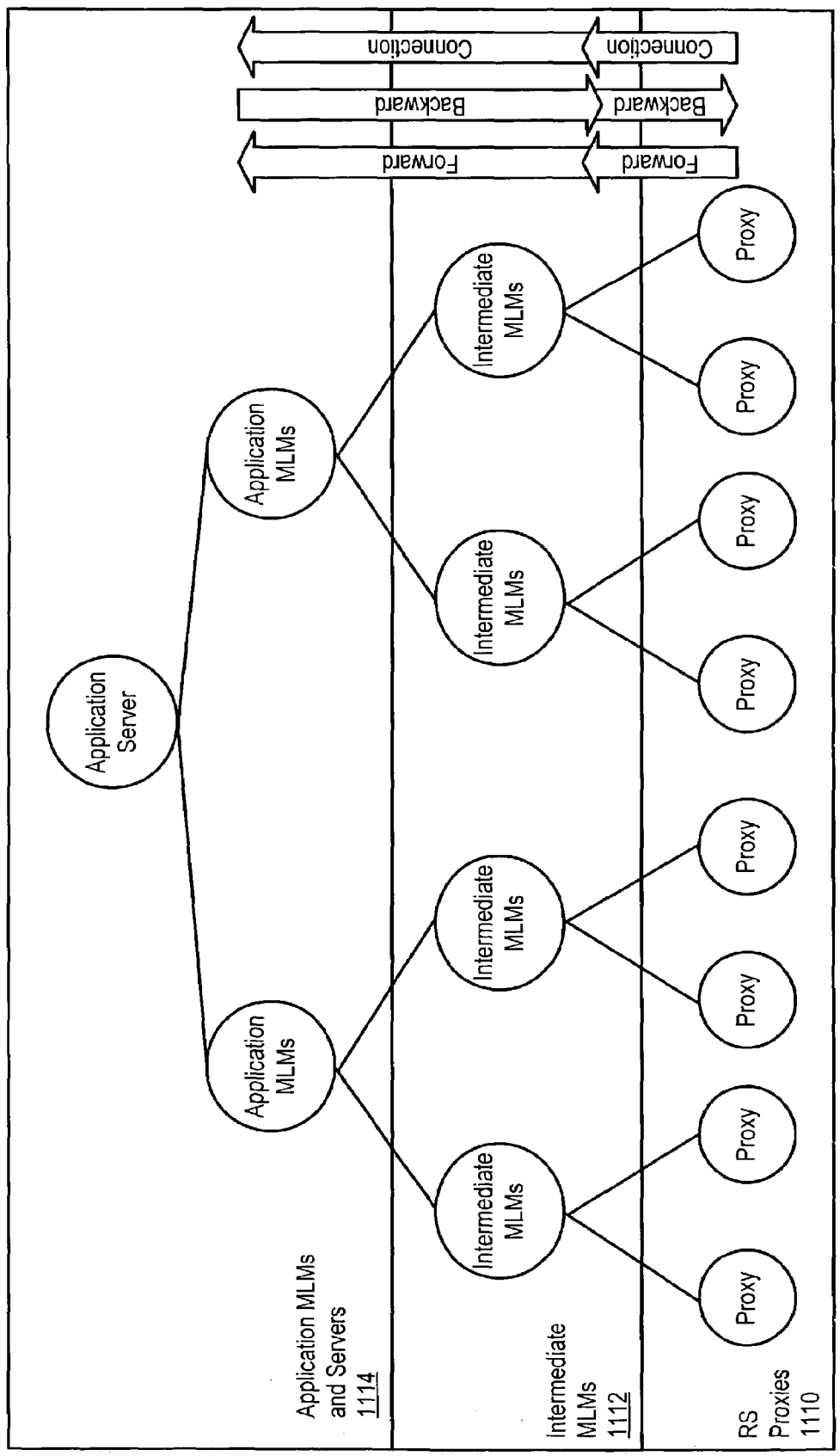
FIG. 11 shows a flow diagram of a remote services system communication.

FIG. 11 shows a flow diagram of communications within a remote services architecture. In one embodiment, the communications between a customer and a service provider is via a wide area network (WAN). Communications within the remote service architecture includes three tiers, a remote services proxy tier 1110, an intermediate MLM tier 1112 and an application MLM and server tier 1114. Communication is established and connections are made from the bottom tier (the remote services proxy tier) to the top tier.

The remote services architecture supports two application protocols for the majority of its services classification support: HTTP and Email messaging. There are a plurality of service module classifications that each have specific communications protocol relationships. More specifically, the service module classifications include a data collection classification, a monitoring classification, a remote access classification and an infrastructure administration classification.

With the data collection classification, the connection orientation is message based, the physical connection support may be Internet, private network or fax, and the protocols supported may be Email or HTTP. Examples of service modules of this classification include an inventory management service module and a performance management service module.

With the monitoring classification, the connection orientation is message based, the physical connection support may be Internet, private network or fax, and the protocols supported may be Email or HTTP. Examples of service modules of this classification include basic self service monitoring and full hardware monitoring with service action.

With the remote access classification, the connection orientation is session based, the physical connection support may be Internet, private network or fax, and the protocol supported is HTTP. The session based connection orientation is one way initiation from the customer. Examples of service modules of this classification include remote dial in analysis and remote core file analysis.

With the infrastructure administration classification, the connection orientation is session based or off-line installation, the physical connection support may be Internet, private network or fax, and the protocol supported includes HTTP, email or physical (e.g., telephone or CD). The session based connection orientation is one way initiation from the customer and the off-line installation is via, e.g., a CD. Examples of service modules of this classification include remote services administration, installation, updates, configuration and notification.

Encryption options are related to the protocol. A secure socket layer (SSL) protocol, for example, is likely to be the chosen protocol for an HTTP transmission, i.e., an HTTPS transmission. The remote services communication architecture does not enforce this however. So, for example, data could be sent by encrypting the body of an HTTP stream. This provides an advantage when a customer's HTTPS proxy infrastructure is not as resilient as their HTTP proxy infrastructure.

Email uses an email encryption option such as s-mime or encrypting the body using a third party encryption method such as PGP. Encryption is optional at all stages. If the customer does not require encryption, then encryption need not be used.

Authentication of the remote services communication is standard for all protocols. Accordingly, the service provider may validate the sender of data and the customer may validate that the service provider is the receiver. Authentication is managed via certificates.

Certificates are used in both the client and server to authenticate a communications session. Client certificates are generated during the customer registration process and are built into the remote services proxy and the customer MLM. By default, each customer is provided a client certificate. The customer can, however, define specific security groups within their service domain and request additional client certificates for those domains. Remote services processes include a certificate distribution mechanism, supporting either the creation of a new security group within an existing customer or the redeployment of a new certificate after a certificate is compromised.

Figure 12:
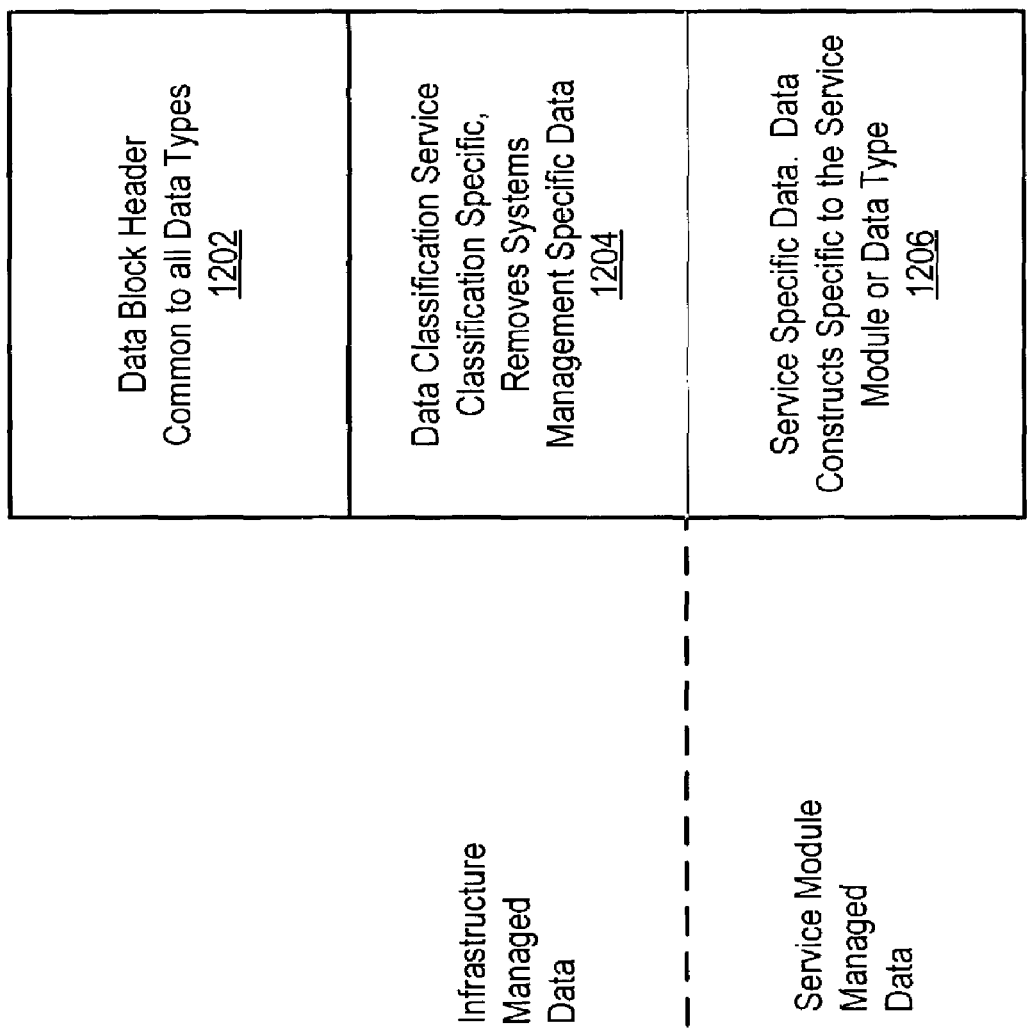
FIG. 12 shows a block diagram of the data blocks that comprise the data that flows through the remote services infrastructure.

FIG. 12 shows a block diagram of the data blocks that comprise the data that flows through the remote services infrastructure. Each system management system conforms to the data definitions that are part of the remote services proxy integrators API 430. The remote services communications architecture provides a normalized view of the data, regardless of in which systems management framework the data originated.

Data block header 1202 is common to all data types. Data block header 1202 contains items such as source, routing information, time to transmit and source type. Data block header 1202 is used to route the data correctly through the remote services system 100 to the correct service module 103. Data block header 1202 is used to provide diagnostic and quality of service measurement built into the system.

Infrastructure data block 1204 provides data classification service classification specific data. Infrastructure data block 1204 removes systems management specific data.

Service module data block 1206 provides format based on each service classification that drives the system the systems management normalization of the data that flows through the system. For example, alarm data includes general characteristics defined such as severity, state and originating support instance.

Figure 13A:
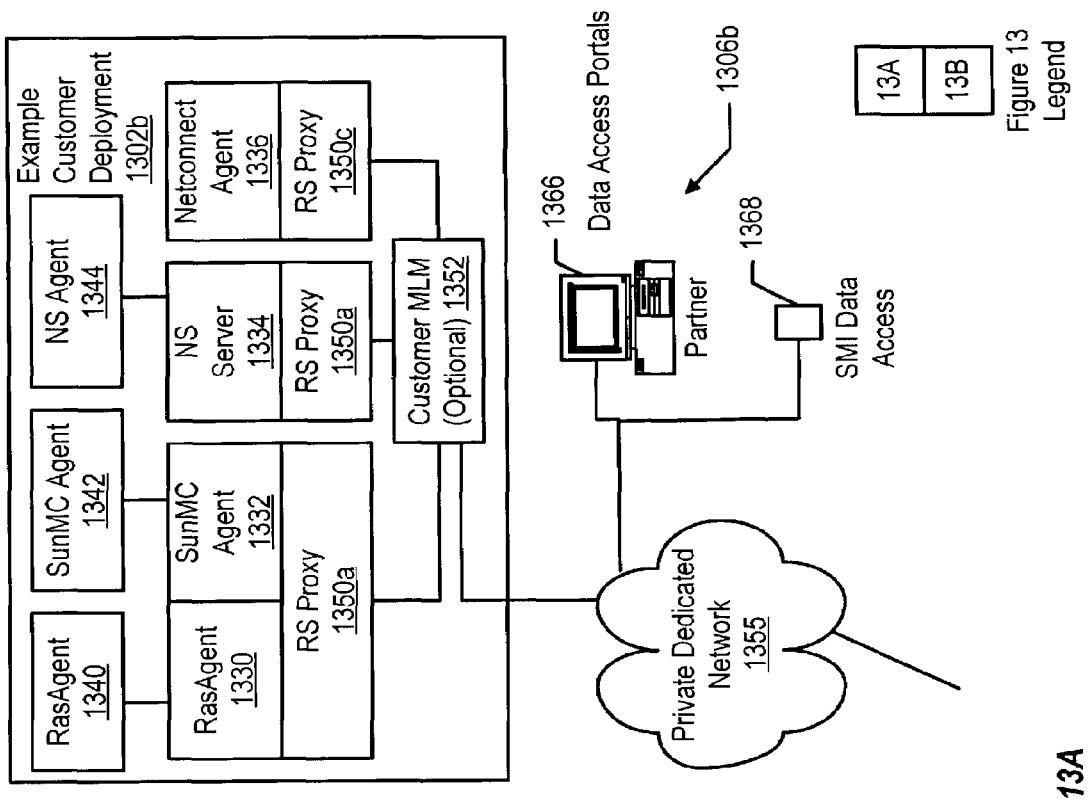
FIGS. 13A and 13B show an example of the high level architecture component relationships of a remote services system that is configured according to the remote services architecture.
Figure 13A:
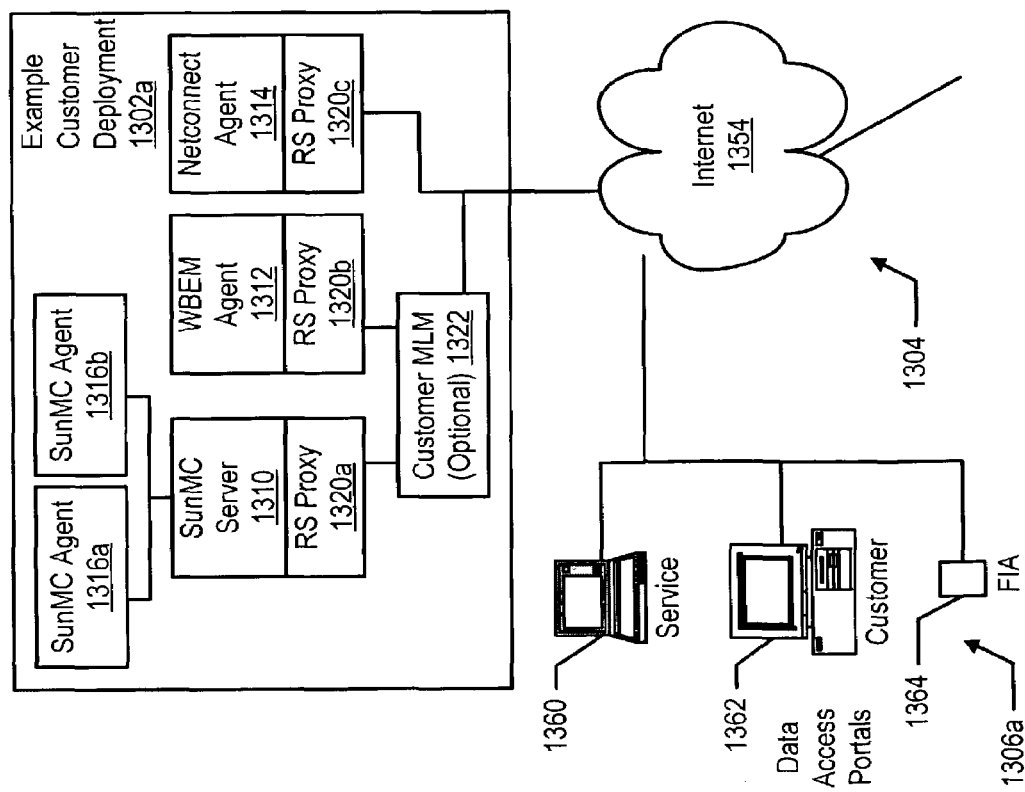
Figure 13B:
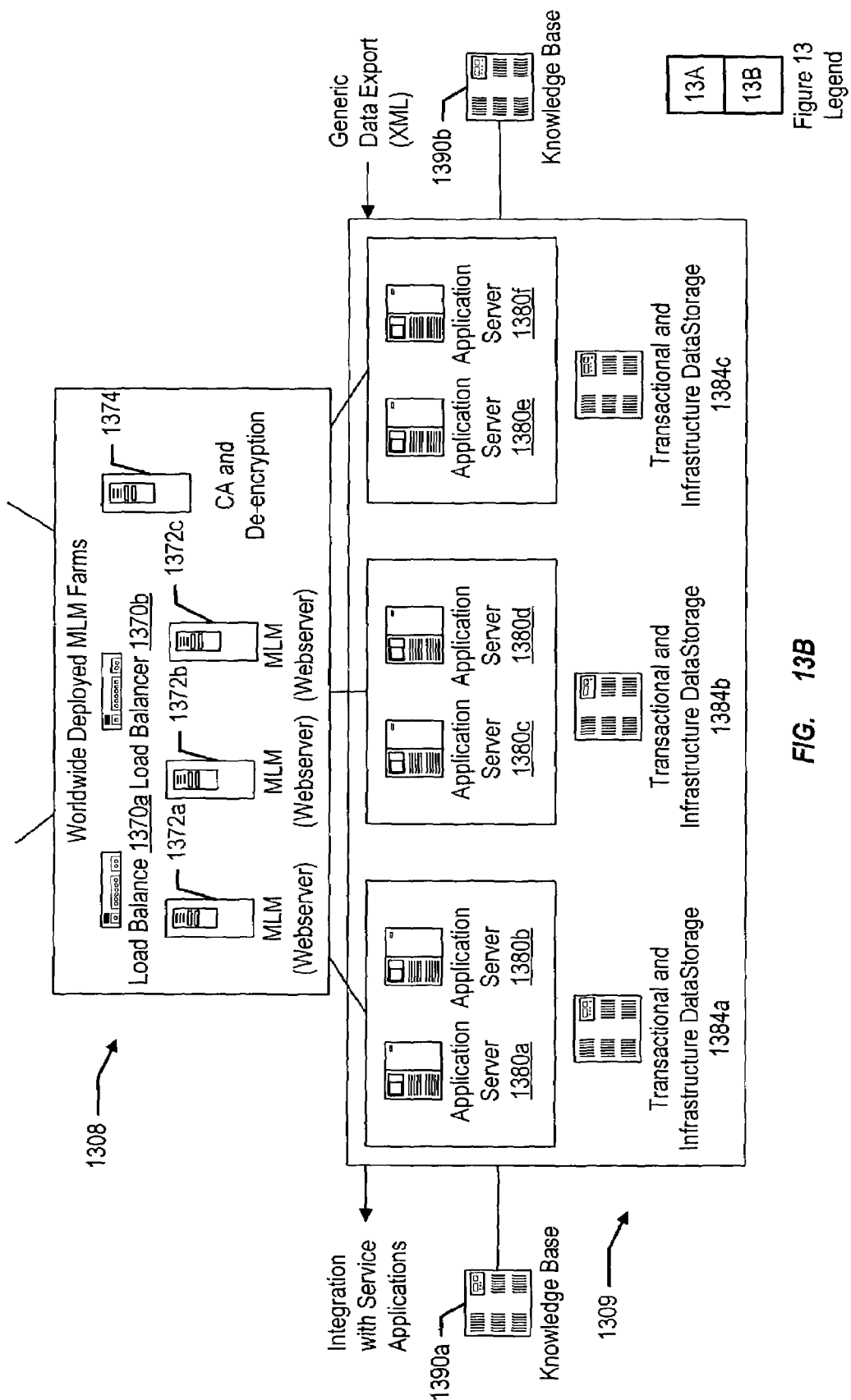

FIGS. 13A and 13B show an example of the component relationships of a remote services system 100 that is configured according to the remote services architecture. Various components of the remote services system 100 execute modules of the remote services infrastructure architecture 205. Remote services system 100 includes customer deployment portion 1302a, 1302b, network portion 1304, data access portal 1306a, 1306b, Mid Level Manager (MLM) portion 1308, and application server portion 309.

Customer deployment portion 1302a sets forth an example customer deployment. More specifically, customer deployment portion 1302a includes SunMC server 1310, WBEM agent 1312, and Netconnect Agent 1314. SunMC agents 1316a, 1316b are coupled to SunMC server 1310. Server 1310, Agent 1312 and Agent 1314 are each coupled to a respective remote services proxy 1320a, 1320b, 1320c. Remote services proxies 1320a, 1320b, 1320c are coupled to network portion 1304, either directly, as shown with proxy 1320c, or via customer MLM 1322, as shown with proxies 1320a and 1320b. Proxies 1320a and 1320b may also be directly coupled to network portion 304 without the MLM 1322 present. The SunMC server is a provider specific systems management server (i.e., health management server). The SunMC agents are provider specific systems management agents (i.e., health management agents). The WEBM agent is a web based enterprise management agent. The Netconnect agent is a basic collection agent. Customer deployment portion 1302a illustrates that the systems management may be 2-tier (e.g., agent, console) or 3-tier (e.g., agent, server, console).

Customer deployment portion 1302b sets forth another example customer deployment. More specifically, customer deployment portion 1302b includes RasAgent 1330, SunMC agent 1332, NS server 1334 and Netconnect Agent 1336. RasAgent 1340 is coupled to RasAgent 1330. SunMC Agent 1342 is coupled to SunMC Agent 1332. NSAgent 1344 is coupled to Netconnect Agent 1336. RasAgent 1330 and SunMC Agent 1332 are coupled to remote services proxy 1350a. Metropolis Server 1334 is coupled to remote service proxy 1350b. Netconnect Agent 1336 is coupled to remote services proxy 1350c. Remote services proxies 1350a, 1350b, 1350c are coupled to network portion 1304 either via customer MLM 1352 or directly. The RasAgent is a reliability, availability, serviceability agent. The NSagent is a network storage agent and the NS server is a network storage server. Both the NSagent and the NS server are reliability, availability, serviceability type devices.

Network portion 1304 includes at least one interconnection network such as the Internet 1354 and/or a private dedicated network 1355. Internet 1354 is assumed to be an existing connection that is reused by the remote services system. The private dedicated network 1355 is a dedicated link that is used exclusively by the remote services system to connect the customer to the service provider. The data to manage the private network is provided by directory services technology held within the application server portion 1308. The directory services technology handles all of the domain name service (DNS) services used to manage name to allocated internet protocol (IP) information. The remote services infrastructure also offers transmission over fax from the customer's environment (not shown). The fax communication is for service modules where the fax transmission makes sense. For example, fax transmission may be used in a military site which does not allow electronic information to be transmitted from it.

Data access portal portions 1306a and 1306b provide access to the remote services system 100. More specifically, data access portal portion 1306a includes a service access portion 1360, a customer access portion 1362 and a field information appliance (FIA) 1364. Data access portal portion 1306b includes a partner access portion 1366 and a system management interface (SMI) data access portion 1368.

Mid level manager portion 1308 includes load balancers 1370a, 1370b, MLM webservers 1372a, 1372b, 1372c and communication authentication (CA) and de-encryption server 1374.

Application server portion 1309 includes a plurality of application servers 1380a–1380f. Application servers 1380a, 1380b are associated with transactional and infrastructure data storage 1384a. Application servers 1380c, 1380d are associated with transactional and infrastructure data storage 1384b. Application servers 1380e, 1380f are associated with transactional and infrastructure data storage 1384c. Application server portion 1309 also includes knowledge base 1390a, 1390b. Application server portion 1309 integrates with service applications as well as via generic data export (such as, e.g., XML).

Remote services proxies 1320, 1350 provide a System Management Integrators API. Using this API, system management products can integrate their customized handling of data into the common data format that is used by the remote services architecture. Accordingly, the system management component of the overall system is effectively segmented away from the remote services architecture.

Additionally, by using the remote services proxies 1320, 1350, the remote services architecture leverages much of a pre-existing instrumentation and data collection mechanisms that already exist. Accordingly, already deployed instrumentation agents within a remote service provider existing system such as those from SunMC and Netconnect may be integrated into a remote services system. Additionally, third party systems management systems may also be supported and integrated via the remote services proxies.

Customer deployment portions 1302a, 1302b each show an optional customer MLM component deployed to the customers environment. Whether to deploy the customer MLM component depends on a number of factors. More specifically, one factor is the number of support instances installed in the customer's environment and the number of services being utilized by the customer. A deployed MLM component can allow greater scale capabilities. Another factor is the type of services deployed within the customer environment. Some services are optimized when an MLM component is deployed to the customer environment to support service specific tasks such as filtering and data aggregation. Another factor is the quality of service. Deploying an MLM component provides a greater level of quality of service because the MLM component provides enhanced data communications technology within the MLM infrastructure modules.

The decision of whether to deploy a remote services MLM component (or more) to the customer's environment is a deployment decision. There are a number of architecture deployment classes which are used to meet the varying customer needs.

The remote services system communicates via two main protocols, HTTP and email. Security considerations for these protocols can be chosen by the customer and plugged into the system. For example, the HTTP protocol may use SSL. Additionally, the email protocol may use some well known form of encryption.

The connections from the customer deployment portion 1302 feed into MLM farms which reside within the SMI service provide environment. These MLM farms are sets of redundant web servers 1372 that are balanced using conventional load balancing technologies. Alongside these web servers 1372 are infrastructure servers 1374 which provide specific infrastructure acceleration for decryption and distribution of certificates for communications authentication.

These MLM farms provide a plurality of functions. The MLM server farms provide remote proxy connections. In deployments when an MLM is not deployed to the customer, the customer's proxy connects to the MLM farms within MLM portion 1308. Also, in deployments when a customer MLM 1322, 1372 is present, the MLM farm communicates and manages communication with the deployed customer MLM 1322, 1372. Also, the MLM server farms provide data processing capabilities, e.g., the MLM farms provide application specific tasks to prepare data for passing to the remote services application server portion 1309. Also, the MLM server farms provide access points for the customer and service personnel via browser like connections. The MLM farm generates the HTML that is presented to the browser.

The MLM technology is based upon known web server technology such as that available from Sun Microsystems under the trade designation iPlanet. Plug-in functionality is provided by the servlet and JSP interfaces available as part of the web server technology.

The remote services application servers 1380 provide data processing and storage for the remote services infrastructure as well as for any hosted service modules. The remote services application servers 1380 are based upon known application server technology such as that available from Sun Microsystems under the trade designation iPlanet application server 6.0. The remote services application server 1380 provides support for horizontal scalability, redundancy and load balancing. Thus providing the back-end components of the remote services architecture with a high level of built in assurance and flexibility. Application partitioning of the application servers 1380 provides processing distribution to ensure that heavy processing that may be required by more complex services are handled appropriately without affecting the remainder of the remote services architecture.

Application server portion 1309 provides integration into existing business systems, generic data export and tight integration with existing knowledge base implementations 1390. Data export is handled through structured XML, data can be exported asynchronously by a client registering to receive data of a particular type or synchronously by the application server 1380 accepting a request from a client.

The core service module API is provided by the application server 1380 using a J2EE implement API. The basic container services of J2EE are extended to provide remote services specific functions and to create the basis of the API. Accordingly, a service module creator can rely on a number of provided for services, such as database persistency, high levels of atomic, consistent, isolated, and durable (ACID) properties, directory service access, authorization protection for the data and access to the data collected by the remote services infrastructure itself.

The creation of a service module, which provides the technology to support a specific remote service, involves at least one of the following components: a creation of detection/collection logic component; a mid-stream analysis and management of data component; an analysis and storage of data component; and, a presentation and management of the data/knowledge component.

The detection/collection logic is created within the domain of a systems management toolkit. The mid-stream analysis and management of data is an optional step and effectively provides analysis of the data within the customer's environment. Inclusion of this logic would mean that the mid-stream analysis and management of data service module would have a remote services MLM deployed to the customer's environment 1302a, 1302b. The deployment of the remote services MLM to the customer's environment reduces and manages the data being sent over the WAN to the remote services provider. The analysis and storage of data component is performed within the application servers domain (the component may be exported). This analysis and storage of data component turns data into knowledge and service value that can then be presented back to the customer. The presentation and management of the data/knowledge component is where the data and knowledge that is developed from the analysis and storage of data component is presented to the customer or service personnel. The presentation and management of data/knowledge component may include interactive support to provide modification of the data values.

Referring again to FIGS. 1 and 2, there are a plurality of API calls available to services modules 103. These services modules 103 may be located, e.g., in the queuing intermediate MLM 216, the application server 226 or the content generation MLM 224. An important aspect of remote services infrastructure 102 components and service modules 103 which come in contact with a remote services message is the ability to manipulate the message transparently, i.e., without necessarily knowing the underlying format or encoding of the message. Accordingly, the service module APIs allow leveraging off of customers' and service providers' existing service module code.

A remote services message may be created or manipulated at various points throughout the remote services system 100. There are a number of actions which are performed on the message during the life cycle of the message. For these actions, the present invention provides a generic API which does not require the caller to understand XML or the format of the message. This API is available in both the C programming language and the Java programming language. This API executes on multiple platforms such as Solaris Windows or Linux.

The following table shows a set of API calls which are available to a developer to create an envelope for remote services messages, add messages to the envelope and extract messages from the envelope. More specifically, Table 1 sets forth a set of envelope management API calls for the C programming language.

TABLE 1

| Function | Return Type | Return Type Description | Parameter | Type | Description |
|---|---|---|---|---|---|
| createEmptyEnvelope | int | 0 on successful creation or −1 on failure (errno will be set to indicate the failure). | envelope | rsEnvlp_t* | Returned opaque handle to the created envelope |
| createEnvelope | int | 0 on successful creation or −1 on failure (errno will be set to indicate the failure). | msgHandle | rsMsg_t* | Handle to the message to be inserted into the envelope. |
| | | | envelope | rsEnvlp_t* | Returned opaque handle to the created envelope |
| addMessage | int | 0 on successful creation or −1 on failure (errno will be set to indicate the failure). | msgHandle | rsMsg_t* | Handle to the message to be inserted into the envelope. |
| | | | envelope | rsEnvlp_t* | Handle to the envelope |
| getMessageCount | int | Number of messages in the envelope (>=0) or −1 if there was an error (errno will be set appropriately). | envelope | rsEnvlp_t* | Handle to the envelope. |
| getMessages | rsMsg_t** | Pointer to array of opaque handles to the RS messages contained in the envelope. | envelope | rsEnvlp_t* | Handle to the envelope. |
| | | | length | int | Number of messages in the returned array. |
| getFormattedEnvelope | char* | Null-terminated string representation of the envelope and all of its contents suitable for transmission over the RS infrastructure. | | | |

Table 2 sets for a set of JAVA API calls for the remote services message envelope. The calls set forth in Table 2 are provided in a class RSEnvelope.

TABLE 2

| Method Name | Return Type | Return Type Description | Parameter | Type | Description |
| --- | --- | --- | --- | --- | --- |
| Constructor | RSEnvelope | Instance of an empty RS envelope. | None | | |
| Constructor | RSEnvelope | Instance of a RS envelope containing the specified message. | RSMessage | RSMessage | RS message to be wrapped in the envelope. |
| addMessage | void | | RSMessage | RSMessage | RS message to be wrapped in the envelope. |
| getMessageCount | int | Number of messages in the envelope. | None | | |
| getMessages | List | List containing all of the RSMessage instances wrapped by the envelope. | None | | |
| getMessageAtIndex | RSMessage | Message at specified index in the envelope. | index | int | Index of the message to be retrieved from the envelope. |
| getFormatted | Byte[ ] | Byte array containing the envelope and the entire contents in a format suitable for transmission over the RS Infrastructure. | None | | |

Table 3 sets for a set of API calls for the creation of remote services messages. The set of API calls are set forth in the C programming language.

TABLE 3

| Function | Return Type | Return Type Description | Parameter | Type | Description |
| --- | --- | --- | --- | --- | --- |
| createRSMsg | int | 0 on successful creation (msgHandle will be valid) or −1 on failure (errno will be set to indicate the failure.) | originatingID | char* | RS ID of the component from which the message originated. Note that this may be different to the message creator's RS Proxy will create a message on behalf of an Integration Module. |
| | | | creatorID | char* | RS ID of the message creator. |

TABLE 3-continued

| Function | Return Type | Return Type Description | Parameter | Type | Description |
|---|---|---|---|---|---|
| | | | msgHandle | RSMsg_t* | Opaque handle to the newly-created message on which further message operations can be performed. |
| creatAlarmMsg | int | 0 on successful creation (msgHandle will be valid) or −1 on failure (errno will be set to indicate the failure). | originatingID | char* | RS ID of the component from which the alarm originated. |
| | | | creatorID | char* | RS ID of the message creator. |
| | | | alarmInfo | alarm_info | Data structure representing the alarm's type, severity, origination time and reported state. |
| | | | msgHandle | rsMsg_t* | Opaque handle to created message. |
| createEventMsg | int | 0 on successful creation (msgHandle will be valid) or −1 on failure (errno will be set to indicate the failure). | originatingID | char* | RS ID of the component from which the event originated. |
| | | | creatorID | char* | RS ID of the component from which the event originated. |
| | | | eventInfo | event_info | Data structure representing the event's type, severity and origination time. |
| | | | msgHandle | rsMsg_t* | Opaque handle to created message. |
| createMsgResponse | int | 0 on successful creation (msgHandle will be valid) or −1 on failure (errno will be set to indicate the failure). | originatingID | char* | RS ID of the component from which the event originated. |
| | | | creatorID | char* | RS ID of the message creator. |
| | | | statusInfo | status_info | Data structure representing the processing status of a received message. |
| | | | msgHandle | rsMsg_t* | Opaque handle to created message. |
| createBulkDataReq | int | 0 on successful creation (msgHandle will be valid) or −1 on failure (errno will be set to indicate the failure). | originatingID | char* | RS ID of the component from which the event originated. |
| | | | creatorID | char* | RS ID of the message creator. |
| | | | class | char* | Data classification. |
| | | | subclass | char* | Data subclass. |
| | | | Size | char* | Size (in bytes) of the bulk data. |

TABLE 3-continued

| Function | Return Type | Return Type Description | Parameter | Type | Description |
|---|---|---|---|---|---|
| createBulkDataResp | int | 0 on successful creation (msgHandle will be valid) or −1 on failure (errno will be set to indicate the failure). | originatingID | char* | RS ID of the component from which the event originated. |
| | | | creatorID | char* | RS ID of the message creator. |
| | | | requestMsgID | char* | Message ID of the associated bulk data request. |

Table 4 sets forth a set of Java API calls for message creation. These methods are available from a class, RSMessageFactory.

TABLE 4

| Method Name | Return Type | Return Type Description | Parameter | Type | Description |
|---|---|---|---|---|---|
| createRSMsg | RSMessage | Instance of a RS message for the forward channel which implements the RSMessage interface. | originating ID | RSID | RS ID of the component form which the message originated. Note that this may be different to the message creator's RS Proxy will create a message on behalf of an Integration Module. |
| | | | creatorID | RSID | RS ID of the message creator. |
| createRSMsg | RSMessage | Instance of a RS message for the back-channel. | destination | RSDestination | RS ID's of the message destination. |
| | | | creatorID | RSID | RS ID of the message creator (for routing information). |
| createAlarmMsg | RSMessage | Instance of a RS Alarm message which implements the RSMessage interface. | originatingID | RSID | RS ID of the component from which the alarm originated. |
| | | | creatorID | RSID | RS ID of the message creator. |
| | | | alarminfo | Alarminfo | Instance of class representing the alarm's type, severity, origination time and reported state. |
| createEventMsg | RSMessage | Instance of a RS Event message which implements the RSMessage | originatingID | RSID | RS ID of the component from which the event originated. |

TABLE 4-continued

| Method Name | Return Type | Return Type Description | Parameter | Type | Description |
|---|---|---|---|---|---|
| | | interface. | creatorID | RSID | RS ID of the message creator. |
| | | | eventInfo | EventInfo | Instance of class representing the event's type, severity and origination time. |
| createMsgResponse | RSMessasge | Instance of a RS Status message which implements the RSMessage interface. | originatingID | RSID | RSID of the component from which the event originated. |
| | | | creatorID | RSID | RS ID of the message creator. |
| | | | statusInfo | StatusInfo | Instance of class representing the sent message's processing status. |
| createBulkDataReq | RSMessage | Instance of a RS message which contains a request to transfer bulk data | originatingID | RSID | RS ID of the component from which the event originated. |
| | | | creatorID | RSID | RS ID of the message creator. |
| | | | classification | String | Data classification. |
| | | | subclass | String | Data subclass. |
| | | | size | int | Size (in bytes) of the bulk data content. |
| createBulkDataResp | RSMessage | Instance of a Nile message which contains a positive acknowledgement to a bulk data request. | originatingID | RSID | RD ID of the component from which the event originated. |
| | | | creatorID | RSID | RS ID of the message creator. |
| | | | requestMsgID | String | Message ID of the associated bulk data request. |

Table 5 sets forth a set of API calls which are available for accessing and mutating the content of a message. The set of API calls are set forth in the C programming language.

TABLE 5

| Function | Return Type | Return Type Description | Parameter | Type | Description |
|---|---|---|---|---|---|
| getHeader | rsHdr_t* | Opaque handle to Nile message header (or NULL if there was an error, and errno will be set appropriately). | msgHandle | rsMsg_t* | Handle to the message. |

TABLE 5-continued

| Function | Return Type | Return Type Description | Parameter | Type | Description |
|---|---|---|---|---|---|
| getContentLength | int | Size of message content (in bytes). Returns −1 if there was an error in determining the size and errno is set to indicate the nature of the error. | msgHandle | rsMsg_t* | Handle to the message. |
| getRawContent | unsigned char* | Raw message content if successful or NULL on failure, in which case errno will be set appropriately. | msgHandle | rsMsg_t* | Handle to the message. |
| | | | length | int* | Pointer to location in which raw content length is stored. |
| getContent | int | Decoded message content or NULL on failure, in which case errno will be set to appropriately. | msgHandle | rsMsg_t* | Handle to the message. |
| | | | length | int* | Pointer to location in which raw content length is stored. |
| setContent | int | 0 on success; −1 on failure, in which case errno will be set appropriately. | msgHandle | rsMsg_t* | Handle to the message. |
| | | | contentBuf | unsigned char* | Buffer containing content. |
| | | | contentLen | int | Length of content. |
| | | | contentType | char* | MIME type of content. |
| getAlarmData | int | 0 on success; −1 on failure, in which case errno will be set appropriately. | msgHandle | rsMsg_t* | Handle to the messsage. |
| | | | alarminfo | alarm_info* | Pointer to structure into which the generic alarm data from the message will be stored. |
| getEventData | int | 0 on success; −1 on failure, in which case errno will be set appropriately. | msgHandle | rsMsg_t* | Handle to the message. |
| | | | eventInfo | event_info* | Pointer to structure into which the generic event data from the message will be stored. |
| getMsgResponse | int | 0 on success; −1 on failure, in which case errno will be set appropriately. | msgHandle | rsMsg_t* | Handle to the message. |
| | | | status | msg_response* | Pointer to structure into which the generic return status of a sent message is returned. |
| getBulkDataReq | int | 0 on success; −1 on failure, in which case errno will be set appropriately. | msgHandle | rsMsg_t* | Handle to the message. |
| | | | size | int* | Pointer to int to hold size of bulk data to be transmitted. |
| getBulkDataResp | int | 0 on success; −1 on failure, in which case errno will be set appropriately. | msgHandle | rsMsg_t* | Handle to the message. |
| | | | bulkdataResp | bulk_response* | Pointer to structure which will contain the URL to which the bulk data is to be sent and the ID of the bulk data request message. |

Table 6 sets forth the Java API calls or message manipulation. These methods are provided by the RSMessage interface.

TABLE 6

| Method Name | Return Type | Return Type Description | Parameter | Type | Description |
|---|---|---|---|---|---|
| getHeader | RS Header | Instance of class representing the header of the specified message. | rsMsg | rsMessage | Instance of a RS message. |
| getRawContent | byte[ ] | Byte array containing the undecoded message content. | None | | |
| getContent | byte[ ] | Byte array containing the decoded message content. | None | | |
| getContentAsStream | Input Stream | Streamed, decoded content from the message. | None | | |
| setContent | void | | content Bytes | byte[ ] | Byte array containing the data to be added as message content |
| | | | content Type | String | MIME type of the content. |
| getAlarmData | Alarm Info | Instance of class containing generic information about the alarm if this was an alarm message. | None | | |
| getEventData | Event Info | Instance of class containing generic information about the event if this was an event message | None | | |
| getMsgResponse | Msg Response | Instance of class containing information about the processing status of a previously sent message. | None | | |
| getBulkDataReq | BulkData Request | Instance of class containing information about a bulk data request message. | None | | |
| getBulkDataResp | BulkData Response | Instance of class containing information about a bulk data response message. | None | | |
| isAlarmData | boolean | True if the message contains generic alarm data. | None | | |
| isEventData | boolean | True if the message contains generic alarm data. | None | | |
| isMsgResponseData | boolean | True if the message contains the return status for a sent message. | None | | |
| isBulkDataRequest | boolean | True if the message contains a bulk data request. | None | | |
| isBulkDataResponse | boolean | True if the message contains a bulk data response. | None | | |

The header of a remote services message mostly contains XML elements which are read only. However, certain fields may be read-write after creation and under certain specific circumstances. The remote services routing information elements is one such read-write element. This element contains data which is used by the remote services system to determine the location of any bottlenecks in the system. Each component of the infrastructure 102 which queues, sends or receives a remote services message adds an element to the routing data, giving its remote services ID, the time that the messages was queued/sent/received the message and a flag indicating the type of action (e.g., created, queued, sent, received).

Similarly, the signedBy attribute of the source element of the message can be written (once) by the aggregation MLM or the application MLM to indicate the remote services ID of the certificate used to encrypt the message. This is used by the applications MLM 218 to prevent spoofed messages entering the remote services application server 226.

Table 7 sets for the C API for accessing and mutating headers of a remote services message.

TABLE 7

| Function | Return Type | Return Type Description | Parameter | Type | Description |
|---|---|---|---|---|---|
| getRoutingData | int | 0 on success; −1 on failure, in which case errno will be set appropriately. | hdrHandle | rsHdr_t* | Handle to the message header. |
|  |  |  | routingData | routing_data** | Returned pointer to array of data-structure representing all routing elements from the message header. |
|  |  |  | length | int* | Returned length of the array of routing data-structure. |
| addRoutingData | int | 0 on success; −1 on failure, in which case errno will be set appropriately. | hdrHandle | rsHdr_t* | Handle to the message header. |
|  |  |  | routingData | routing_data | Data-structure whose contents represent the routing information to be added. |
| setSignedBy | int | 0 on success; −1 on failure, in which case errno will be set appropriately. | hdrHandle | rsHdr_t* | Handle to the message header. |
|  |  |  | signedByID | char* | RS ID of the sender whose certificate was used to encrypt the message. |
| getSignedBy | char* | RS ID of the sender whose certificate was used to sign/encrypt the message. | hdrHandle | rsHdr_t* | Handle to the message header. |
| getSender | char* | RS ID of the message creator. | hdrHandle | rsHdr_t* | Handle to the message header. |
| getOriginator | char* | RS ID of the message originator. This is likely to be different to the sender where the message comes from | hdrHandle | rsHdr_t* | Handle to the message header. |

TABLE 7-continued

| Function | Return Type | Return Type Description | Parameter | Type | Description |
|---|---|---|---|---|---|
| getSender | char* | an Integration ModuleStatus. RS ID of the message creator. | hdrHandle | rsHdr_t* | Handle to the message header. |
| getOriginator | char* | RS ID of the message originator. This is likely to be different to the sender where the message comes from an Integration ModuleStatus. | hdrHandle | rsHdr_t* | Handle to the message header. |
| getDestination | rs_destination | Datastructure representing the RS ID's of the destination for this message. Can be NULL if the message is not on the backchannel. | hdrHandle | rsHdr_t* | Handle to the message header. |
| getQos | RSQOS | Quality of service parameters or NULL if the message is not on the forward-channel | hdrHandle | rsHdr_t* | Handle to the message header. |
| setQos | int | 0 on success; −1 on failure, in which case errno will be set appropriately. | hdrHandle qos | rsHdr_t* rsQOS | Handle to the message header. Quality of service datastructure - only valid on messages on forward-channel. |

Table 8 sets forth the Java API calls for message header manipulation. These methods are provided in a RSHeader interface.

TABLE 8

| Method Name | Return Type | Return Type Description | Parameter | Type | Description |
|---|---|---|---|---|---|
| getRoutingData | List | List containing instances of the RoutingData class which provide the detail of each routing element. | None | | |
| addRoutingData | boid | | RoutingData | RoutingData | Routing information to be added. |

TABLE 8-continued

| Method Name | Return Type | Return Type Description | Parameter | Type | Description |
|---|---|---|---|---|---|
| getSentBy | RSID | RS ID of sender whose certificate was used to sign or encrypt this message or null if the field was not sent. | None | | |
| getOriginator | RSID | RS ID of the component from which this message originated. | None | | |
| getCreator | RSID | RS ID of the component which created this message | None | | |
| getDestination | RSDestination | Class containing the RSID's of the destination(s) for this message or null if the message is not on the backchannel. | None | | |
| setQoS | void | | qos | NileQos | Quality of service parameters - only valid on messages on the forward-channel. |
| getQoS | RSQoS | Quality of service parameters for this message or null if this is a backchannel message. | | | |

Other Embodiments

Other embodiments are within the following claims.

What is claimed is:

1. An apparatus for interfacing between a plurality of service modules and a remote services system, the remote services system including an intermediate mid level manager, an applications mid level manager and an application server, the apparatus comprising:

an intermediate mid level manager application program interface coupled to the intermediate mid level manager, the intermediate mid level manager application program interface allowing service modules to be loaded into the intermediate mid level manager;

an applications mid level manager application program interface coupled to the applications mid level manager, the applications mid level manager application program interface allowing service modules to be loaded into the applications mid level manager; and an applications server application program interface coupled to the application server, the applications server application program interface allowing service modules to be loaded into the applications server wherein the intermediate mid level manager application program interface, the applications mid level manager application program interface, and the applications server application program interface can each provide a normalization point wherein data is normalized from a system management representation to a remote services representation, and wherein the applications mid level manager is interposed between the intermediate mid level manager and the application server.

2. The apparatus of claim 1 wherein the service module application program interface includes an intermediate mid level manager application program interface; and the remote services infrastructure includes an intermediate mid level manager coupled to the intermediate mid level manager application program interface, the intermediate mid level manager application program interface allowing service modules to be loaded into the intermediate mid level manager.

3. The apparatus of claim 2 wherein
the intermediate mid level manager application program interface provides mid data stream services.

4. The apparatus of claim 3 wherein
the mid data stream services include data aggregation and filtering.

5. The apparatus of claim 2 wherein
the intermediate mid level manager application program interface provides access and control over data between the intermediate mid level manager and the service module.

6. The apparatus of claim 1 wherein
the service module application program interface includes an applications mid level manager application program interface; and
the remote services infrastructure includes an applications mid level manager coupled to the applications mid level manager application program interface, the service module application program interface allowing service modules to be loaded into the applications mid level manager.

7. The apparatus of claim 6 wherein
the applications server application program interface provides access to a database function and access to an authorization schema function.

8. The apparatus of claim 1 wherein
the service module application program interface includes an applications server application program interface; and
the remote services infrastructure includes an application server coupled to he applications server application program interface, the applications server application program interface allowing service modules to be loaded into the applications server.

9. The apparatus of claim 8 wherein
the content generation mid level manager application program interface provides a browser based presentation function to services modules coupled to the content generation mid level manager.

10. The apparatus of claim 1 wherein
the service module application program interface includes a content generation mid level manager application program interface; and
the remote services infrastructure includes a content generation mid level manager coupled to the content generation mid level manager application program interface, the content generation mid level manager application program interface allowing service modules to be loaded into the content generation mid level manager.

* * * * *